US010836150B2

(12) United States Patent
Tussing et al.

(10) Patent No.: US 10,836,150 B2
(45) Date of Patent: Nov. 17, 2020

(54) SURFACE ROUGHENING OF POLYMER FILMS

(71) Applicant: Novelis Inc., Atlanta, GA (US)

(72) Inventors: Christian Tussing, Göttingen (DE); Heinrich Prinzhorn, Göttingen (DE); Dhiren Bhupatlal Ruparelia, Göttingen (DE); Andy Preston, Atlanta, GA (US)

(73) Assignee: NOVELIS INC., Atlanta, GA (US)

( * ) Notice: Subject to any disclaimer, the term of this patent is extended or adjusted under 35 U.S.C. 154(b) by 0 days.

(21) Appl. No.: 15/940,139

(22) Filed: Mar. 29, 2018

(65) Prior Publication Data

US 2018/0281377 A1 Oct. 4, 2018

Related U.S. Application Data

(60) Provisional application No. 62/478,793, filed on Mar. 30, 2017.

(51) Int. Cl.
 *B05D 1/28* (2006.01)
 *B32B 38/00* (2006.01)
 (Continued)

(52) U.S. Cl.
 CPC ............ *B32B 38/0036* (2013.01); *B05D 1/02* (2013.01); *B05D 1/28* (2013.01); *B05D 3/0254* (2013.01);
 (Continued)

(58) Field of Classification Search
 CPC ........ B32B 38/0036; B05D 1/02; B05D 1/28; B05D 3/0254
 See application file for complete search history.

(56) References Cited

U.S. PATENT DOCUMENTS 3,905,854 A * 9/1975 Kaercher .................. B65C 9/24
 156/212
4,052,323 A * 10/1977 Feneberger ........ C10M 169/044
 508/118
(Continued)

FOREIGN PATENT DOCUMENTS

CN 1761579 A 4/2006
CN 101166491 A 4/2008
(Continued)

OTHER PUBLICATIONS

International Application No. PCT/US2018/025121, "International Search Report and Written Opinion", dated Aug. 23, 2018, 13 pages.
First Examination Report issued in Australian Application No. 2018244458 dated Feb. 15, 2019 (2 pages).
Office Action issued in Canadian Application No. 3,027,261 dated Feb. 7, 2019 (3 pages).
(Continued)

*Primary Examiner* — Kelly M Gambetta
(74) *Attorney, Agent, or Firm* — Kilpatrick Townsend & Stockton LLP

(57) ABSTRACT

The surface roughness of a polymer film laminated to a metal substrate can be improved through the use of sufficient heating after application of a wax layer to the polymer film. In some cases, a thin liquid film or layer of a waterborne wax dispersion can be applied to the surface of a metal substrate laminated with a polymer film. After heating the polymer film and wax layer to a point at which the polymer film and wax layer begin to become molten, the surface roughness of the polymer film can become improved due to the presence of the wax.

13 Claims, 16 Drawing Sheets

(51) Int. Cl.
  *B32B 15/09* (2006.01)
  *B32B 37/18* (2006.01)
  *B32B 15/20* (2006.01)
  *B05D 1/02* (2006.01)
  *B05D 3/02* (2006.01)
  *C22F 1/04* (2006.01)
  *B32B 15/08* (2006.01)
  *B32B 37/00* (2006.01)

(52) U.S. Cl.
  CPC .............. *B32B 15/08* (2013.01); *B32B 15/09* (2013.01); *B32B 15/20* (2013.01); *B32B 37/0076* (2013.01); *B32B 37/182* (2013.01); *B32B 38/0012* (2013.01); *C22F 1/04* (2013.01); *B32B 2038/0048* (2013.01); *B32B 2255/10* (2013.01); *B32B 2255/24* (2013.01); *B32B 2307/72* (2013.01)

(56) References Cited

U.S. PATENT DOCUMENTS

| | | | |
|---|---|---|---|
| 4,362,775 | A | 12/1982 | Yabe et al. |
| 7,472,740 | B2 | 1/2009 | Anderson et al. |
| 7,748,434 | B2 | 7/2010 | Wagstaff |
| 8,927,113 | B2 | 1/2015 | Anderson et al. |
| 2002/0192440 | A1 | 12/2002 | Fields et al. |
| 2004/0229071 | A1* | 11/2004 | Jankosky ............. C22F 1/04 428/621 |
| 2007/0215313 | A1 | 9/2007 | Wagstaff |
| 2011/0220645 | A1* | 9/2011 | Niederst ............. B32B 15/08 220/200 |
| 2013/0034744 | A1 | 2/2013 | Anderson et al. |
| 2014/0162055 | A1* | 6/2014 | Kitagawa ............ B32B 27/08 428/336 |
| 2015/0202843 | A1 | 7/2015 | Siemen et al. |
| 2016/0075903 | A1* | 3/2016 | Miller-Jupp ......... C09D 5/008 428/334 |
| 2017/0005299 | A1* | 1/2017 | Kuramoto .......... H01M 2/0202 |
| 2017/0326862 | A1 | 11/2017 | Spahn et al. |

FOREIGN PATENT DOCUMENTS

| | | |
|---|---|---|
| CN | 101778744 A | 7/2010 |
| CN | 102224006 A | 10/2011 |
| DE | 69830001 | 3/2006 |
| EP | 2781278 A1 | 9/2014 |
| JP | S55-60088 U | 4/1980 |
| JP | H08-118544 A | 5/1996 |
| JP | 2001-145848 A | 5/2001 |
| JP | 2002-166918 A | 6/2002 |
| JP | 2002166918 A * | 6/2002 |
| JP | 2013-107093 A | 6/2013 |
| JP | 2017-512685 A | 5/2017 |
| WO | 2010/065316 A2 | 6/2010 |
| WO | 2010065316 | 6/2010 |
| WO | 2016/158875 A1 | 10/2016 |

OTHER PUBLICATIONS

Office Action issued in Korean Application No. 10-2019-7001643 dated Mar. 18, 2019, along with an English translation (4 pages).
Chun et al., "The role of polymer nanosurface roughness and submicron pores in improving bladder urothelial cell density and inhibiting calcium oxalate stone formation", Nanotechnology, Feb. 2, 2009, pp. 8.
Dai et al., "Ion-Beam Induced Surface Roughening of Poly-(methyl methacrylate) (PMMA) Tuned by a Mixture of Ar and O2 Ions", Plasma Processes and Polymers, Oct. 11, 2012, pp. 975-983.
Fu et al., "Fabrication of super-hydrophobic surfaces on aluminum alloy substrates", Applied Surface Science 255.5 (2008): 1776-1781.
Lee et al., "Surface modification of and selective protein attachment to a flexible microarray pattern using atmospheric plasma with a reactive gas", Acta biomaterialia 6.2 (2010): 519-525.
PCT/US2018/025121, "Invitation to Pay Additional Fees and, Where Applicable, Protest Fee", Jul. 2, 2018, 7 pages.
Qian et al., "Fabrication of Superhydrophobic Surfaces by Dislocation-Selective Chemical Etching on Aluminum, Copper, and Zinc Substrates", Langmuir, 2005, pp. 9007-9009.
Ting et al., "Surface roughening of polystyrene and poly (methyl methacrylate) in Ar/O2 plasma etching", Polymers 2.4 (2010): 649-663.
Vrij et al., "Rupture of Thin Liquid Films Due to Spontaneous Fluctuations in Thickness", Contribution from the van't Hoff Laboratory, University of Utrecht, Jun. 5, 1968, pp. 3074-3078.
Fart et al., "Drying of solids wetted by thin liquid films", Canadian Journal of Physics, 1990, pp. 1084-1088.
Office Action issued in Mexican Patent Application No. MX/a/2018/015530 dated Jul. 11, 2019, along with an English translation (6 pages).
Office Action issued in Canadian Patent Application No. 3,027,261 dated May 9, 2019 (3 pages).
Office Action issued in Chinese Patent Application No. 201880002547.1 dated Jun. 3, 2019, along with an English translation (18 pages).
Office Action issued in Japanese Patent Application No. 2018-568877 dated Jun. 18, 2019, along with an English translation (6 pages).
Russian Application No. 2019102152, "Office Action" dated Aug. 28, 2019, along with an English translation, 12 pages.
Chinese Application No. 201880002547.1, "Office Action," dated Nov. 18, 2019, along with an English translation, 14 pages.
Chinese Application No. 201880002547.1, "Office Action", dated Mar. 24, 2020, 19 pages.
Mexican Application No. MX/a/2018/015530, "Office Action", dated Feb. 17, 2020, 4 pages.
Russian Application No. 2019102152, "Decision on Granting", dated Jan. 9, 2020, 11 pages.
European Application No. 18722770.7, "Office Action", dated Apr. 20, 2020, 3 pages.
Chinese Application No. 201880002547.1, "Notice of Decision to Grant", dated Jul. 6, 2020, 3 pages.
Indian Application No. 201817048572, "First Examination Report", dated Jun. 23, 2020, 6 pages.

* cited by examiner

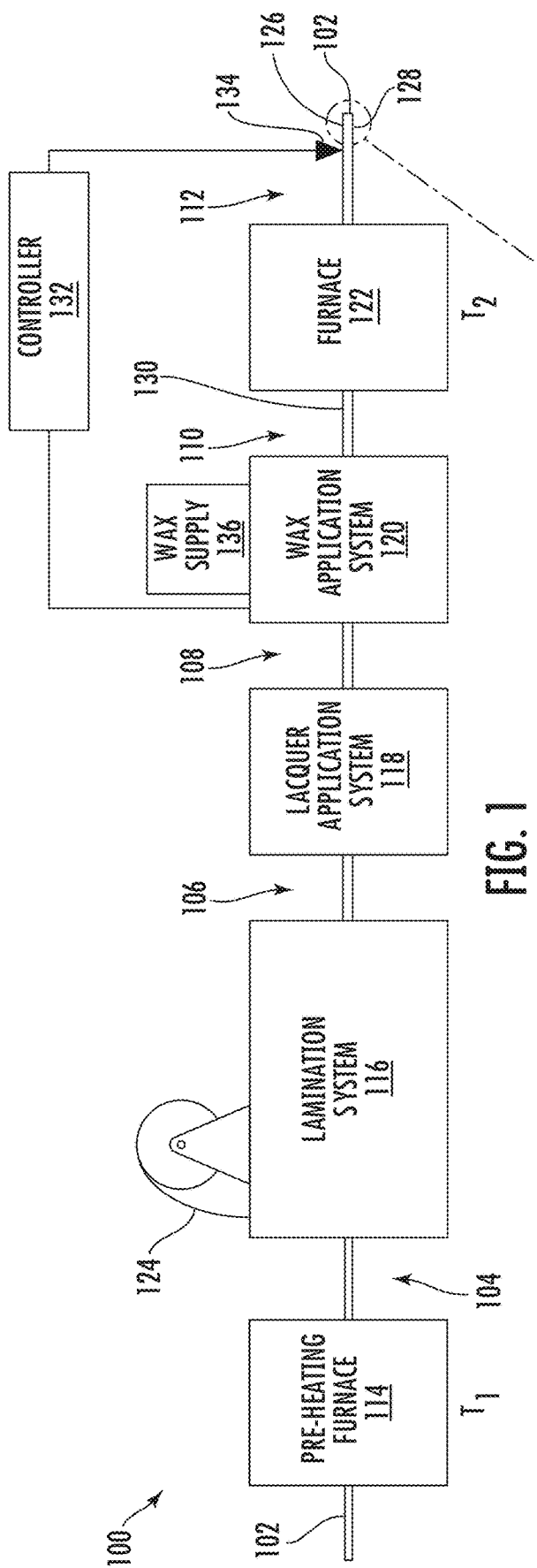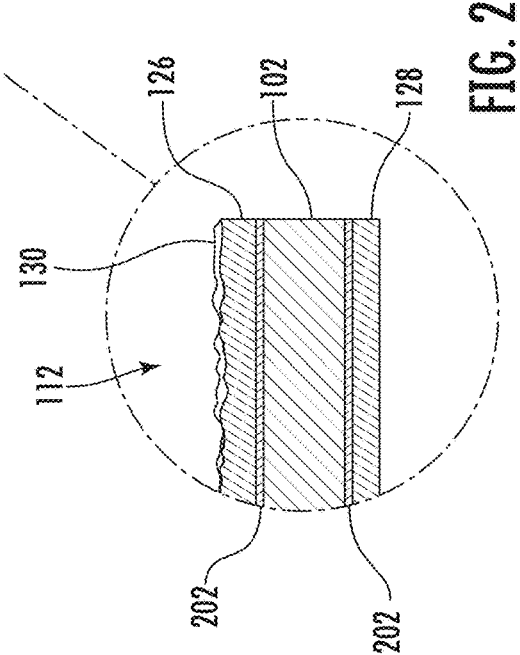

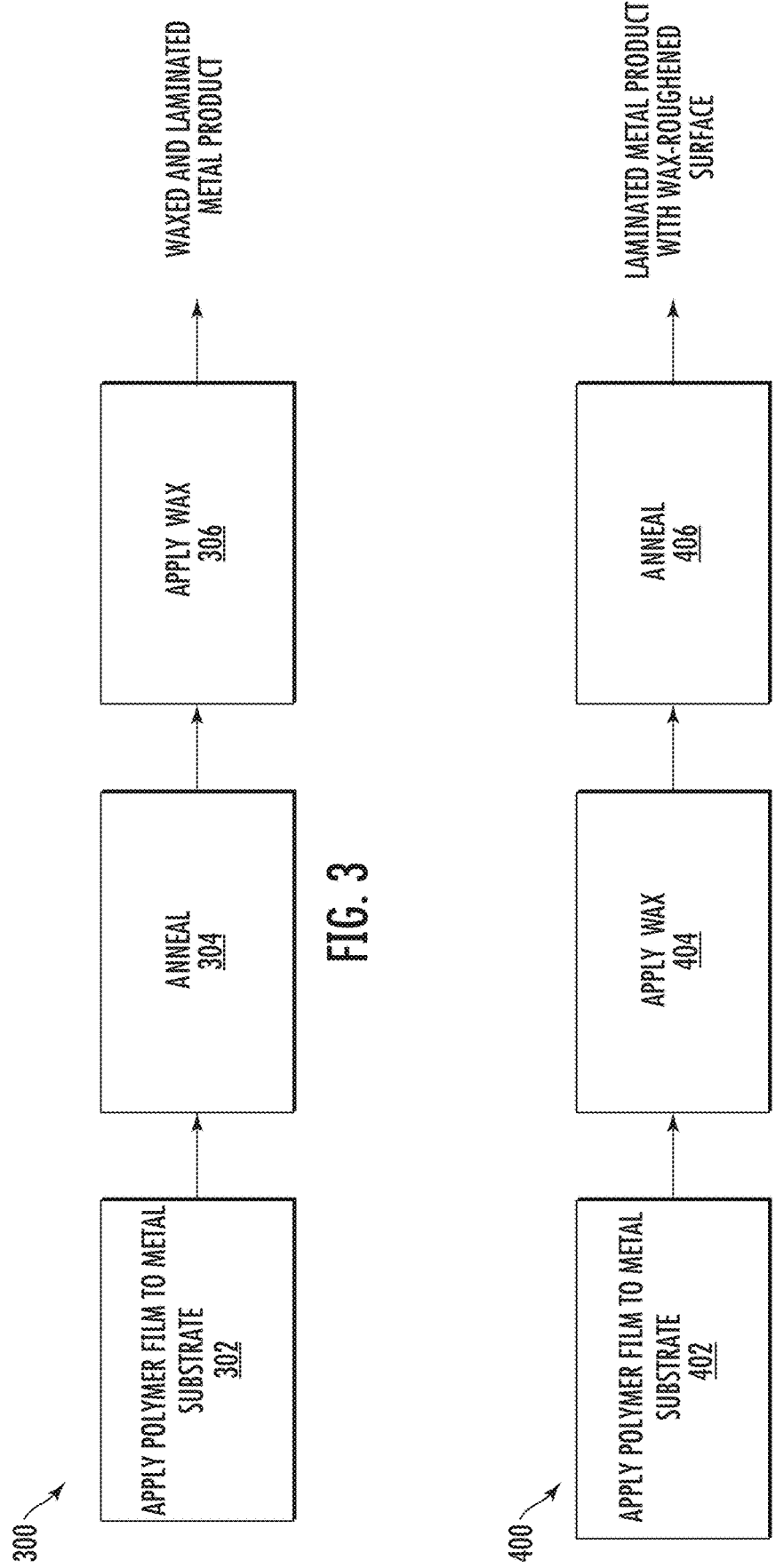

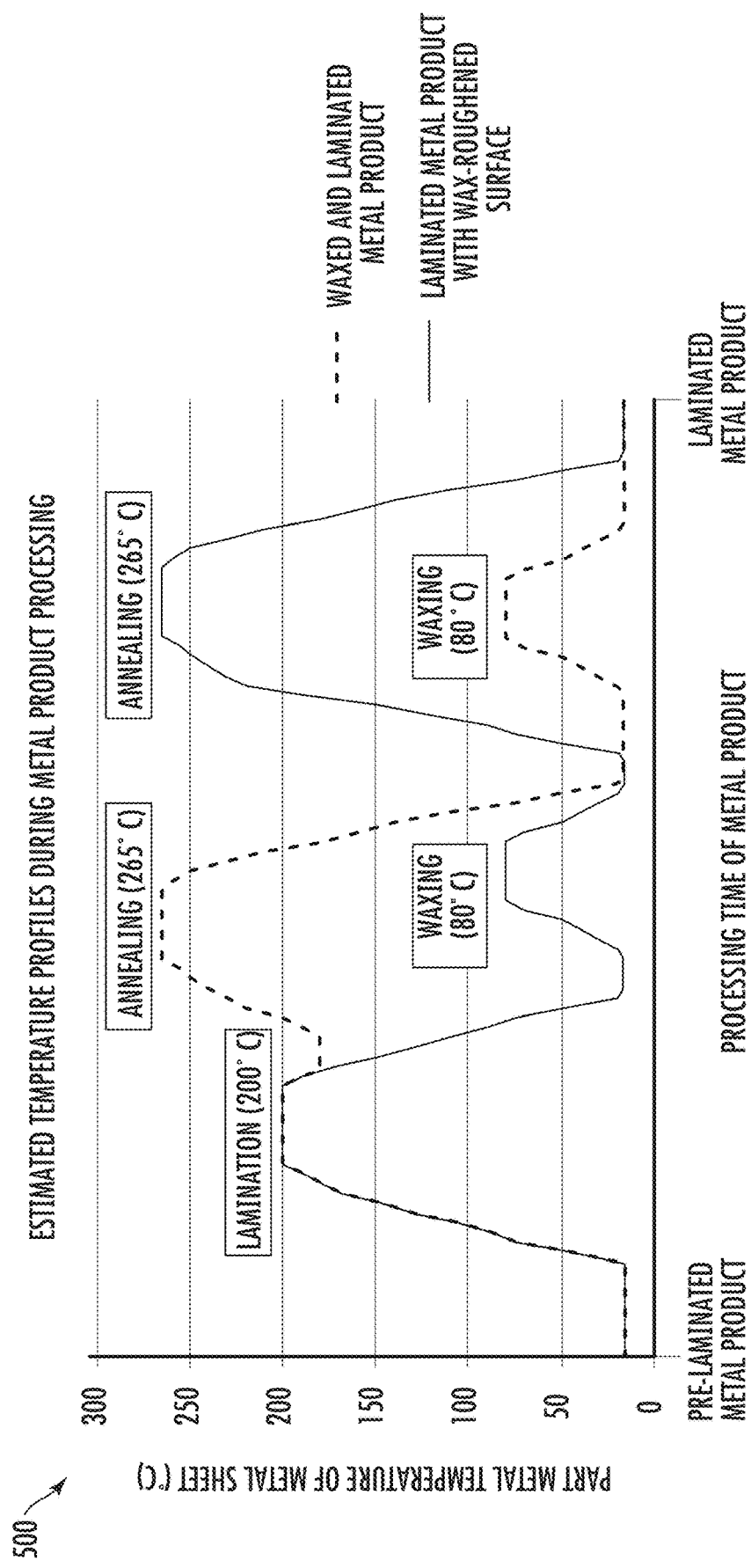

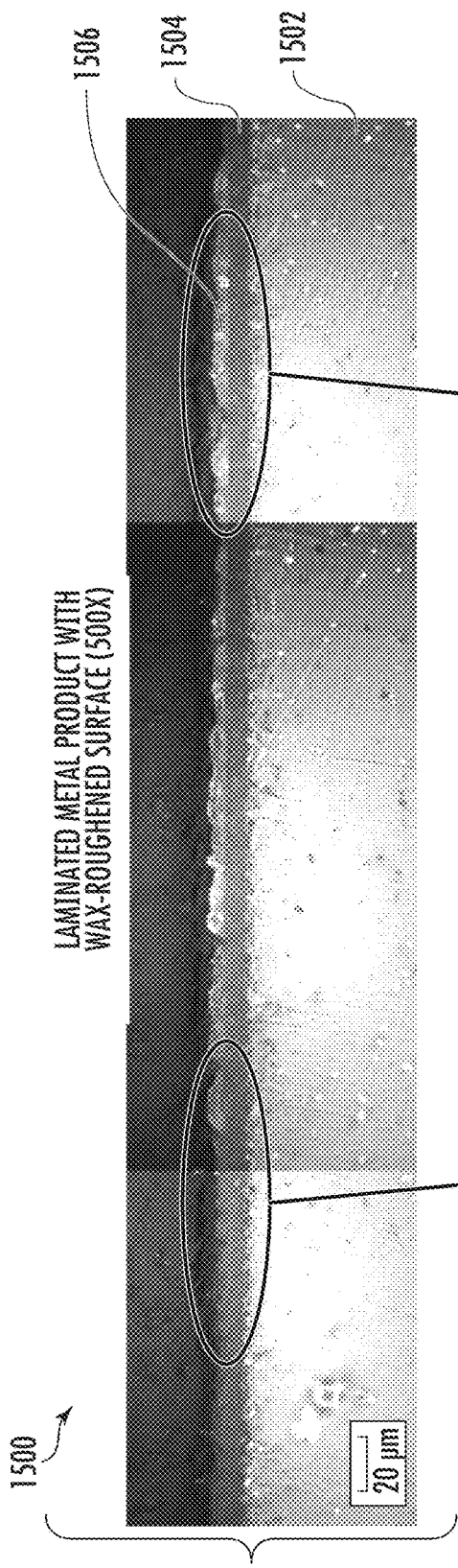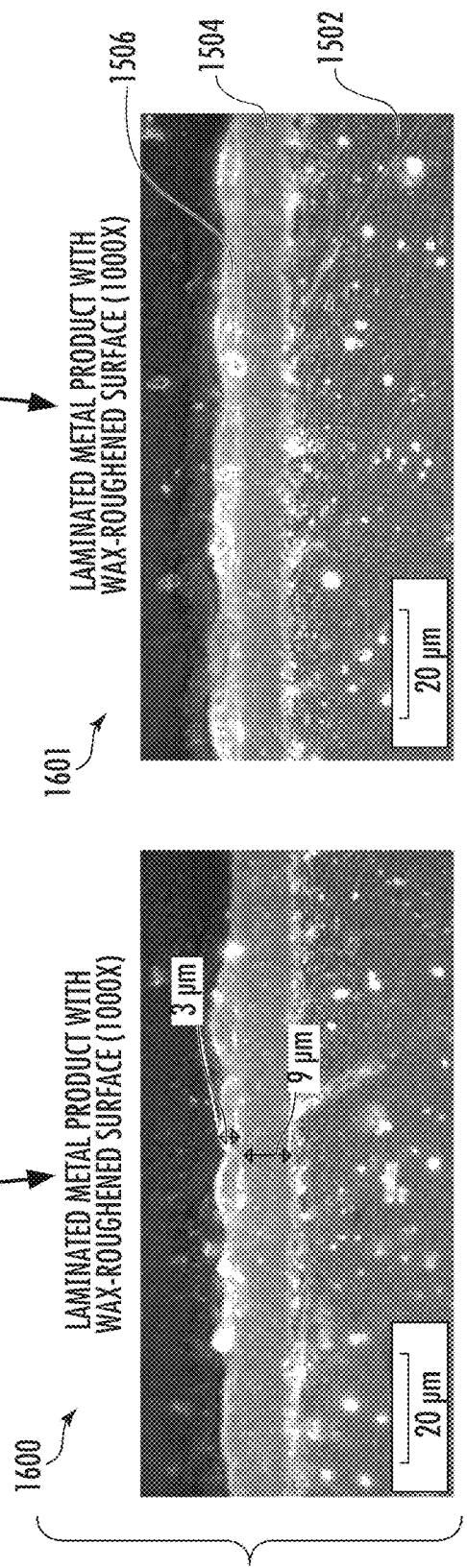
FIG. 15
FIG. 16

SURFACE ROUGHENING OF POLYMER FILMS

CROSS-REFERENCE TO RELATED APPLICATION

The present application claims the benefit of U.S. Provisional Application No. 62/478,793, filed Mar. 30, 2017, the disclosure of which is hereby incorporated by reference in its entirety.

FIELD

The present disclosure relates to metalworking generally and more specifically to improving surface roughness on laminated metal products.

BACKGROUND

Certain metal products, such as aluminum beverage cans, may require a protective layer, such as a polymer coating, between the metal and its contents. For example, beverage cans often must provide sufficient protection between the metal of the beverage can and the beverage contained therein to avoid damage to the metal from harsh beverages, such as sodas and colas, as well as to avoid undesirable effects to the beverage, such as discoloration, corrosion, or change in taste. Polymer coatings can be beneficial for other applications as well.

Polymer films, such as biaxially produced polyethylene terephthalate (PET) films, are used as laminates for metal products for various purposes, such as interior linings of food or liquid containers. Polymer films, such as PET films, are commercially available with very smooth, shiny surfaces. The biaxial production method used for polymer film creation can facilitate the generation of smooth surfaces of the polymer film. Additionally, dry lacquer films applied by roll coating also have surfaces that are very smooth and shiny, due at least in some part to the application process, especially if no additional matting agents are used.

Techniques exist to roughen the surface of the polymer substrate, such as etching the polymer surface by dissolving components into the surface, immersing the surface in a reactive gas, bombarding the surface with ions, performing thermal and capillary fluctuations, or embossing the hot surface with a work roll. All of these techniques require substantial equipment, energy, and/or resources.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Described herein is a method for preparing a metal product comprising applying a polymer film to a surface of a metal substrate, applying a layer of wax to an outer layer of the polymer film, and heating the polymer film and the layer of wax to a temperature above a melting temperature of the polymer film.

In some cases, applying the layer of wax comprises distributing a volume of waterborne wax using a roll coater or a spray header. In some cases, applying the layer of wax comprises applying a layer of wax at a thickness of from about 25 nm to about 100 nm. In some cases, applying the layer of wax comprises applying a layer of wax at a coating weight of from about 10 mg/m$^2$ to about 25 mg/m$^2$. In some cases, applying the layer of wax to the outer layer of the polymer film occurs prior to applying the polymer film to the surface of the metal substrate. In some cases, heating the polymer film and the layer of wax to the temperature above the melting temperature of the polymer film comprises heating the polymer film and the layer of wax above a melting temperature of an outer layer of the polymer film. In some cases, the method further comprises measuring a surface roughness parameter of the polymer film after heating the polymer film and the layer of wax and adjusting a thickness of the layer of wax using the measured surface roughness parameter.

The present disclosure also includes metal products. The metal products can be prepared according to the methods described herein. In some cases, the metal product comprises a polymer film attached to a surface of a metal substrate, wherein an outer layer of the polymer film facing away from the metal substrate has a roughness average of at least about 2 µm, and a layer of wax adhered to the outer layer of the polymer film. The layer of wax can comprise a thickness of from about 25 nm to about 100 nm. In some examples, the layer of wax can comprise a coating weight of from about 10 mg/m$^2$ to about 25 mg/m$^2$. Optionally, the metal substrate comprises an aluminum alloy (e.g., a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy). The polymer film can comprise polyethylene terephthalate. Optionally, the layer of wax can comprise a layer of a polyethylene wax or a layer of a carnauba wax.

Also disclosed is a system including a lamination system for applying a polymer film to a surface of a metal substrate; a wax application system positioned downstream of the lamination system for accepting the metal substrate and applying a wax layer to an outer layer of the polymer film, the outer layer facing away from the metal substrate, to form a metal product; and a furnace positioned downstream of the wax application system for accepting the metal product and raising a temperature of the wax layer and the polymer film to at least above a melting temperature of the outer layer of the polymer film.

In some cases, the system further comprises a supply of waterborne wax coupled to the wax application system, wherein the wax application system comprises a roll coater or a spray header fluidly coupled to the supply of waterborne wax. In some cases, the wax application system is configured to apply the wax layer at a thickness of from about 25 nm to about 100 nm. In some cases, the wax application system is configured to apply the wax layer at a coating weight of from about 10 mg/m$^2$ to about 25 mg/m$^2$. In some cases, the system further includes a surface roughness measurement device positioned downstream of the furnace; and a controller coupled to the surface roughness measurement device and the wax application system to adjust a thickness of the wax layer applied by the wax application system in response to measurements from the surface roughness measurement device. Optionally, the wax application system is configured to apply the wax at a thickness that results in a surface roughness measurement of at least about 2 μm.

BRIEF DESCRIPTION OF DRAWINGS

The specification makes reference to the following appended figures, in which use of like reference numerals in different figures is intended to illustrate like or analogous components.

FIG. 1 is a schematic diagram of a system for preparing a laminated metal product according to certain aspects of the present disclosure.

FIG. 2 is a close-up side view of the prepared metal product of FIG. 1 according to certain aspects of the present disclosure.

FIG. 3 is a flowchart depicting a process for preparing a waxed and laminated metal product according to certain aspects of the present disclosure.

FIG. 4 is a flowchart depicting a process for preparing a laminated metal product with a wax-roughened surface according to certain aspects of the present disclosure.

FIG. 5 is a chart depicting estimated temperature profiles for a waxed and laminated metal product and a laminated metal product with a wax-roughened surface according to certain aspects of the present disclosure.

FIG. 15 is an optical micrograph depicting a side elevation of a laminated metal product with a wax-roughened surface according to certain aspects of the present disclosure.

FIG. 16 is a set of optical micrographs depicting the side elevation of the laminated metal product with the wax-roughened surface of FIG. 15 according to certain aspects of the present disclosure.

DETAILED DESCRIPTION

Figure 6:
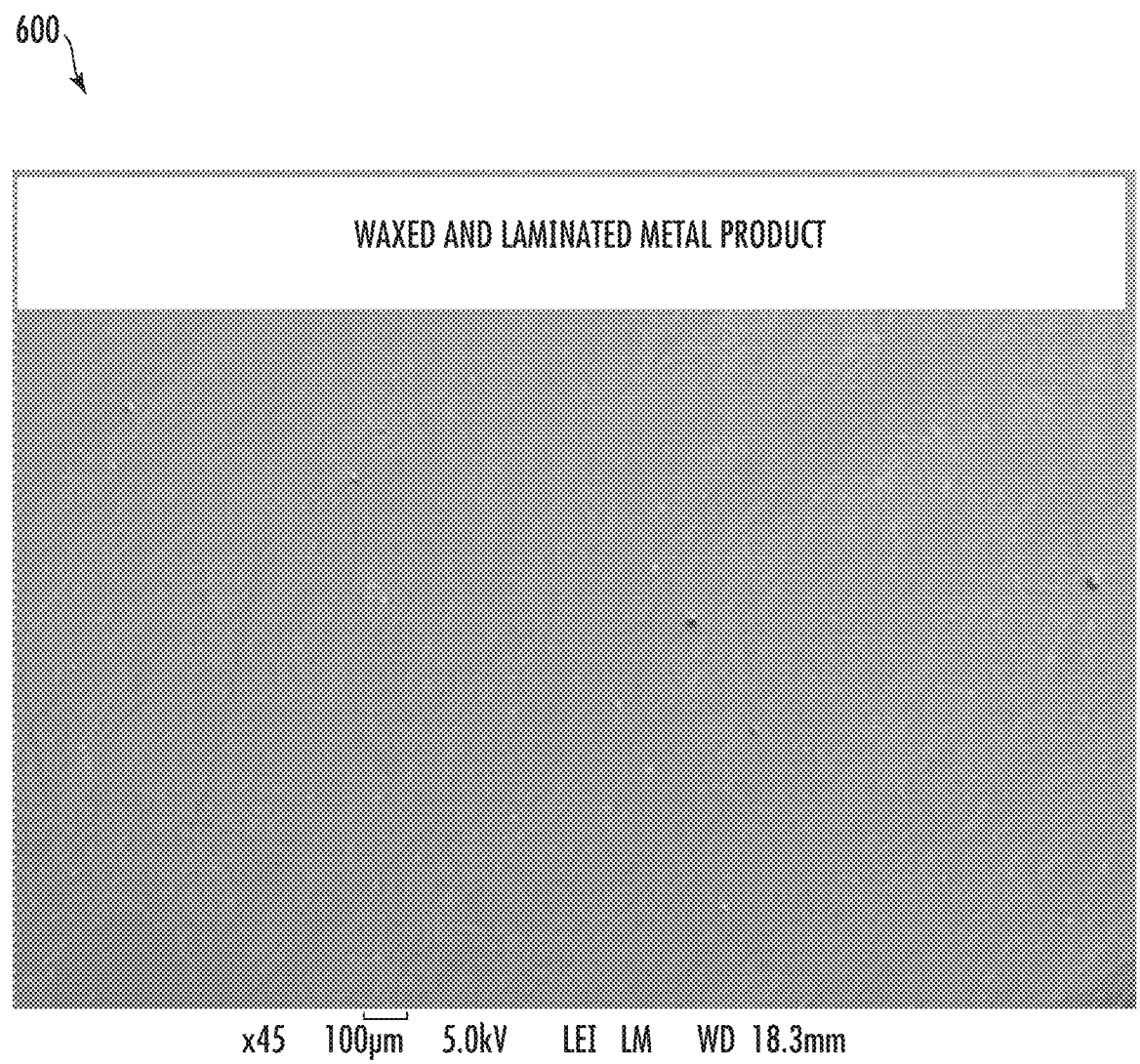
FIG. 6 is a scanning electron micrograph of a waxed and laminated metal product according to a first variant according to certain aspects of the present disclosure.

Certain aspects and features of the present disclosure relate to improving surface roughness of a polymer film laminated to a metal substrate. In some cases, a thin liquid film or layer of a waterborne wax dispersion can be applied to the surface of a metal substrate laminated with a polymer film (e.g., applied to an outer layer of the polymer film that faces away from the metal substrate) to form a metal product. After heating the polymer film and wax layer to a point at which the polymer film and wax layer begin to become molten, the surface roughness of the polymer film can become improved (e.g., increased) due to the presence of the wax. In some cases, certain aspects and features of the present disclosure are especially suitable for preparing laminated metal products, such as laminated aluminum products.

The surface roughening effect can occur for a number of reasons, such as buoyancy forces related to the density of the polymer components or segregation by processing resulting from the immiscibility of the molten polymer and the wax layer. As a result, a co-continuous network morphology of two phases may be formed at the surface of the film, resulting in a self-organized and very rough surface.

DEFINITIONS AND DESCRIPTIONS

The terms "invention," "the invention," "this invention," and "the present invention" used herein are intended to refer broadly to all of the subject matter of this patent application and the claims below. Statements containing these terms should be understood not to limit the subject matter described herein or to limit the meaning or scope of the patent claims below.

As used herein, the meaning of "a," "an," or "the" includes singular and plural references unless the context clearly dictates otherwise.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, or less than about 0.3 mm (e.g., about 0.2 mm).

As used herein, the term foil indicates an alloy thickness in a range of up to about 0.2 mm (i.e., 200 microns (μm)). For example, a foil may have a thickness of up to 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, or 200 μm.

In this description, reference is made to alloys identified by aluminum industry designations, such as "series" or "5xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the term metal product can refer to any suitable shape or size of cast product, as appropriate.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Metal Product

Described herein are metal products that include a polymer film attached to (e.g., laminated to) a metal substrate and a wax layer attached to the outer layer of the polymer film. The surface roughness of the polymer film attached to the metal substrate can be improved through the use of sufficient heating after application of a wax layer to the polymer film. In some cases, a thin liquid film or layer of a waterborne wax dispersion can be applied to the surface of a metal substrate laminated with a polymer film to form a metal product, as further described herein. After heating the polymer film and wax layer to a point at which the polymer film and wax layer begin to become molten, the surface roughness of the polymer film can become improved due to the presence of the wax.

Metals for use as the metal substrate can include aluminum, aluminum alloys, magnesium, magnesium-based materials, titanium, titanium-based materials, copper, copper-based materials, steel, steel-based materials, bronze, bronze-based materials, brass, brass-based materials, or any other suitable metal or combination of materials.

In some examples, the metal substrate includes an aluminum alloy. Suitable aluminum alloys for use as the metal substrate include 1xxx series aluminum alloys, 2xxx series aluminum alloys, 3xxx series aluminum alloys, 4xxx series aluminum alloys, 5xxx series aluminum alloys, 6xxx series aluminum alloys, 7xxx series aluminum alloys, and 8xxx series aluminum alloys.

Suitable 1xxx series aluminum alloys for use as metal substrates include, for example, AA1050, AA1060, AA1070, AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, and AA1199.

Suitable 2xxx series aluminum alloys for use as metal substrates include, for example, AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, and AA2199.

Suitable 3xxx series aluminum alloys for use as metal substrates include, for example, AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

Suitable 4xxx series aluminum alloys for use as metal substrates include, for example, AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, and AA4147.

Suitable 5xxx series aluminum alloys for use as metal substrates include, for example, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

Suitable 6xxx series aluminum alloys for use as metal substrates include, for example, AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, and AA6092.

Suitable 7xxx series aluminum alloys for use as metal substrates include, for example, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, and AA7099.

Suitable 8xxx series aluminum alloys for use as metal substrates include, for example, AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, and AA8093.

The aluminum alloys for use as the metal substrates can be in any suitable temper, including the tempers described above.

Optionally, the metal substrates can be a cladded product including a core layer and one or more cladding layers. The core layer has a first side and a second side and one or more cladding layer(s) can be bonded to the first side or the second side of the core layer. In some examples, the core layer is clad on only one side (i.e., one cladding layer is present in the clad aluminum alloy product). In other examples, the core layer is clad on both sides (i.e., two cladding layers are present in the clad aluminum alloy product).

The cladding layer(s) can be attached to a core layer by direct chill co-casting (i.e., fusion casting) as described in, for example, U.S. Pat. Nos. 7,748,434 and 8,927,113, both of which are hereby incorporated by reference in their entireties; by hot and cold rolling a composite cast ingot as described in U.S. Pat. No. 7,472,740, which is hereby incorporated by reference in its entirety; or by roll bonding to achieve the required metallurgical bonding between the core and the cladding.

Optionally, the core layer and/or the one or more cladding layers can include a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy.

The metal substrate for use in the metal products described herein can have any suitable gauge. For example, the metal substrate can be a foil (e.g., below approximately 0.20 mm), a sheet (e.g., from approximately 0.20 mm to 4.0 mm), a shate (e.g., from approximately 4.0 mm to 15.0 mm), or a plate (e.g., greater than approximately 15.0 mm), although other thicknesses and ranges can be used as well.

The metal products described herein also include a polymer film. The polymer film can include, for example, films including one or more of polyethylene terephthalate (PET), polyurethane elastomers, polyesters (e.g., hydrophobic polyesters) polyvinyl chloride, polystyrene, polysilicone (e.g., silicone (meth)acrylate), polyolefins (e.g., polyethylene or polypropylene), and polyamides.

The polymer film can include can include a core layer and an outer layer. In some cases, the core layer is directly attached to the metal substrate. In other cases, one or more additional intervening layers can be present between the core layer of the polymer film and the metal substrate. Optionally, one or more of the additional intervening layers can be a conversion layer. The conversion layer can include components of chromium(III), chromium(VI), titanium, zirconium, and phosphates. Optionally, one or more of the additional intervening layers can include a copolymer hot melt or an adhesive.

The outer layer of the polymer film is a surface facing away from the metal substrate. In some examples, the outer layer of the polymer film can have a roughness average of at least about 1.5 µm (e.g., at least about 1.6 µm, at least about 1.7 µm, at least about 1.8 µm, at least about 1.9 µm, at least about 2.0 µm, at least about 2.1 µm, at least about 2.2 µm, at least about 2.3 µm, at least about 2.4 µm, at least about 2.5 µm, at least about 2.6 µm, at least about 2.7 µm, at least about 2.8 µm, at least about 2.9 µm, or at least about 3.0 µm). In some examples, the outer layer of the polymer film can have a roughness average of from about 1.5 µm to about 3.5 µm (e.g., from about 1.8 µm to about 3.3 µm or from about 2.0 µm to about 3.0 µm).

The metal products described herein also include a layer of wax. The layer of wax can be attached to the outer layer of the polymer film. Any suitable wax can be used. Examples of suitable waxes include polyethylene waxes and carnauba waxes. Waxes can be natural or synthetic. In some cases, a wax, as used herein, can include any material that has a melting temperature of from approximately room temperature (e.g., at or around 21° C.) to the melting temperature of the polymer film and that is immiscible with the polymer film when the polymer film and wax are both in a liquid state.

The layer of wax can have any suitable thickness. It can be desirable to provide a layer of wax on the order of tens or hundreds of nanometers thick. For example, the layer of wax can be provided to a thickness of from about 25 nm to about 200 nm, from about 25 nm to about 100 nm, or from about 40 nm to about 90 nm. In some cases, a layer of wax can be provided to a thickness of from about 25 nm, 30 nm, 35 nm, 40 nm, or 45 nm and no more than 90 nm, 100 nm, 110 nm, 120 nm, 130 nm, 140 nm, 150 nm, 160 nm, 170 nm, 180 nm, 190 nm, or 200 nm. In some cases, the amount of wax provided can be on the order of ones or tens of milligrams of wax per square meter. In some cases, a layer of wax can be provided in amounts resulting in a coating weight of greater than 1 mg/m$^2$, 2 mg/m$^2$, 3 mg/m$^2$, 4 mg/m$^2$, 5 mg/m$^2$, 6 mg/m$^2$, 7 mg/m$^2$, 8 mg/m$^2$, 9 mg/m$^2$, or 10 mg/m$^2$, and less than 50 mg/m$^2$, 45 mg/m$^2$, 40 mg/m$^2$, 35 mg/m$^2$, 30 mg/m$^2$, 25 mg/m$^2$, 20 mg/m$^2$, 15 mg/m$^2$, or 10 mg/m$^2$. In some cases, a layer of wax can be provided in an amount of from about 10 mg/m$^2$ to about 25 mg/m$^2$ (e.g., from about 12 mg/m$^2$ to about 22 mg/m$^2$ or from about 15 mg/m$^2$ to about 20 mg/m$^2$).

Optionally, the metal products described herein include a layer of lacquer to form a hybrid laminated/lacquered metal product. In some cases, the layer of lacquer is directly attached to the metal substrate on the side opposite the polymer film.

Methods of Making

The metal products described herein can be prepared by applying a thin liquid film or layer of a waterborne wax dispersion to the surface of a metal substrate laminated with a polymer film. After heating the polymer film and wax layer to a point at which the polymer film and wax layer begin to become molten, the surface roughness of the polymer film can become improved due to the presence of the wax. The metal product is the combination of the metal substrate, polymer film, and wax layer.

The wax layer can be applied in any suitable manner, including through the use of bar coating devices, roll coating devices, spray headers, and electrostatic oilers. Especially desirable surface roughness results can be achieved by applying wax at a thickness and/or coat weight as described above and by thereafter melting the polymer film.

After the wax layer is applied, the metal product can be heated to at least partially melt the polymer film to induce surface roughening of the polymer film. In some cases, these techniques can include applying a polymer to a metal substrate heated to a first temperature ($T_1$) before heating the combined metal substrate, polymer, and wax layer to an annealing temperature ($T_2$), wherein $T_1$ is below the melting temperature ($T_m$) of the polymer and $T_2$ is above $T_m$. In some cases, $T_2$ is at or above approximately 250° C., 255° C., 257° C., 260° C., 265° C., 270° C., 275° C., or 280° C. In some cases, heating the metal substrate and polymer to $T_2$ can anneal the metal substrate.

In some cases, a metal product can be laminated on two sides. In some cases, a metal product can be laminated on one side and lacquered on an opposite side. For example, a metal product can be laminated on an interior-facing side and lacquered on an exterior-facing side, although other configurations can be used. This hybrid laminated/lacquered metal product can provide laminate with improved roughness on the interior of the can end stock through use of a polymer film, such as PET laminate, with applied wax while maintaining high cosmetic performance on the exterior of the can end stock through use of a lacquer, which may not be prone to problems associated with the polymer film.

In some cases, the laminated metal stock is passed directly from a lamination process into an annealing process (e.g., into an annealing furnace). In some cases, the laminated metal stock is passed directly from a lamination process into a lacquer application system and then into an annealing process (e.g., into an annealing furnace).

The improved surface roughness of the polymer film can have a beneficial optical appearance as well as a beneficial tactile feeling for various applications. Additionally, improvements in surface roughness can be beneficial for further downstream processing. For example, high surface roughness can be useful for metal products being processed using high speed tools (e.g., a few hundred strokes per minute). A metal product having high surface roughness can improve runability of the metal product at higher press speeds. Additionally, a metal product having high surface roughness can stack upon other strips and can coil more easily than smooth metal products.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a system 100 for a laminated metal product according to certain aspects of the present disclosure. The laminated metal product can be used for any suitable application, such as for can end stock (CES). A metal substrate 102 is passed into a pre-heating furnace 114 that heats the metal substrate 102 to a pre-heating temperature ($T_1$). The pre-heating temperature $T_1$ is below the melting temperature ($T_m$) of the polymer film 124 that will be laminated to the metal substrate 102. In some cases, the pre-heating temperature $T_1$ is at or below approximately 250° C., 240° C., 220° C., 200° C., 190° C., 180° C., 170° C., or 150° C. In some cases, the pre-heating temperature $T_1$ is within a range of 120° C. and 250° C., within a range of 170° C. and 240° C., or 190° C. and 220° C., however other temperatures can be used. The pre-heated metal substrate 104 can pass into a lamination system 116. The metal substrate 102, as a pre-heated metal substrate 104, is passed through a lamination system 116 that applies a polymer film 124 to one side of the metal substrate 102. In some cases, the polymer film 124 can be applied to both sides of the metal substrate 102. The lamination system 116 can be any suitable system for laminating a polymer film 124 to the metal substrate 102. A laminated metal substrate 106 exits the lamination system 116, combining the metal substrate 102 with the polymer film 124. The polymer film 124 can include a core layer and an outer layer. The outer layer can be located opposite the core layer from the metal substrate. In some cases, the core layer directly couples to the metal substrate 102, however in other cases an additional layer (e.g., a copolymer hot melt or an adhesive) can be used to couple the core layer to the metal substrate 102.

In some cases, the laminated metal substrate 106 can optionally pass into a lacquer application system 118. Lacquer 128 is applied to the metal substrate 102 by the lacquer application system 118. The lacquer application system 118 can be any suitable system for applying lacquer 128 to the metal substrate 102. A lacquer application system 118 can include an oven for heating or curing the lacquer 128 onto the metal substrate 102, such as an infrared oven. In some cases, the lacquer application system 118 is downstream of (e.g., after) the lamination system 116. In some cases, the lacquer application system 118 is upstream of (e.g., before) an annealing furnace 122. In some cases, the lacquer application system 118 is upstream of the lamination system 116 or the pre-heating furnace 114. In some cases, the lacquer application system 118 is downstream of both the lamination system 116 and the annealing furnace 122. As shown in FIG. 1, the lacquer application system 118 is located between the lamination system 116 and the annealing furnace 122. A laminated, lacquered metal substrate 108 can exit the lacquer application system 118.

After the lamination system 116, the laminated metal substrate 106 can enter a wax application system 120. In some cases, when a lacquer application system 118 is used, a laminated, lacquered metal substrate 108 can enter the wax application system 120. In the wax application system 120, a wax layer 130 can be applied to the surface of the laminated polymer film 124. The wax layer 130 can be applied in various suitable fashions. In some cases, the wax layer 130 can be applied by bar coating, roll coating, spray coating, or electrostatic oilers. In some cases, the wax layer 130 can be applied by electrostatic application. Other techniques can be used. The wax application system 120 can be coupled to a wax supply 136. The wax supply 136 can be any suitable supply of wax. The wax supply 136 can be a source of pure wax or can be a source of a readymade wax-based product for use by the wax application system 120. For example, in cases where the wax application system 120 applies the wax layer 130 as a layer of a waterborne wax dispersion, the wax supply 136 can be a source of pure wax that can be mixed with water on-the-fly as needed to create the waterborne wax dispersion, or the wax supply 136 can be a source of premixed waterborne wax dispersion.

After exiting the wax application system 120, the waxed and laminated metal product 110 can enter the annealing furnace 122. In the annealing furnace 122, the waxed and laminated metal product 110 can be heated to a temperature sufficient to melt the laminated polymer film 124. The annealing furnace 122 can be positioned downstream of (e.g., after) the lamination system 116 and optionally the lacquer application system 118.

The annealing furnace 122 raises the temperature of the waxed and laminated metal product 110 to a raised temperature ($T_2$). The raised temperature $T_2$ is higher than the melting temperature ($T_m$) of the polymer film 124. In some cases, $T_2$ is at or above approximately 250° C., 255° C., 257° C., 260° C., 265° C., 270° C., 275° C., or 280° C. Therefore, during the heating process, the polymer film 124 melts and is able to flow into the mechanical features (e.g., surface textures) of the metal substrate 102 and becomes amorphous due to fast quenching after the annealing with the process temperature $T_2$. Further, when the polymer film 124 melts, its interaction with the wax layer 130 can increase the surface roughness of the polymer film 124. The roughness effects may occur for various reasons, such as natural migration of certain polymer components of the polymer film 124 interacting with the wax layer. The immiscibility of the molten polymer and the wax layer can result in a co-continuous network morphology of two phases at the surface of the film, resulting in a rough surface.

The prepared metal product 112 includes a lamination layer having an improved surface roughness (e.g., over a metal product laminated using standard techniques). After exiting the annealing furnace 122, the prepared metal product 112 can undergo further processing, such as optionally quenching the prepared metal product 112 in a volume of quenching liquid or through application of coolant to the prepared metal product 112. The prepared metal product 112 can be cooled immediately after exiting the annealing furnace 122, through quenching or otherwise, at a rate sufficient to avoid substantial recrystallization of the amorphous polymer. In some cases, the prepared metal product 112 is cooled to below approximately 150° C. within a desired duration of approximately 30 seconds, 25 seconds, 20 seconds, 15 seconds, 10 seconds, 5 seconds, or 2 seconds or less. In some cases, the prepared metal product 112 is cooled to below approximately 150° C. within a duration of approximately 2 to 15 seconds. Avoiding substantial recrystallization can avoid blushing of the polymer. It can be desirable to have a weight fraction at or below 30%, 25%, 20%, or 15% of the recrystallizable part of the polymer being recrystallized. It can further be desirable for crystals formed to be at or below approximately 100 nm in diameter.

In some cases, the prepared metal product 112 produced by system 100 can include a metal substrate 102 to which a layer of lacquer 128 has been applied to a first side and to which a layer of laminated polymer film 124 has been applied to a second side, as shown in FIG. 1. The metal substrate 102 of the prepared metal product 112 can be annealed and can include a crystalline polymer film 124 laminated thereto prior to being heated to a temperature above the melting temperature $T_m$ of the polymer film 124 for a sufficient duration to allow the polymer film 124 to melt into the surface texture of the metal substrate 102 and become amorphous. Additionally, during heating, the polymer film 124 can interact with the wax layer 130 to improve the surface roughness of the prepared metal product 112 and result in a wax-roughened polymer film 126.

In some cases, a controller 132 can be coupled to the wax application system 120 to control the amount of wax applied to the polymer layer, and thus the thickness of the wax layer applied to the polymer layer. In some cases, controller 132 operates using preset inputs and values designed to produce a desired result (e.g., a desired surface roughness). In some cases, controller 132 operates using a feedback mechanism based on data collected from a surface roughness measurement device 134. The data can be any suitable data related to surface roughness. The surface roughness measurement device 134 can be any contacting or non-contacting measurement device suitable for measuring parameters related to or indicative of surface roughness. Examples of suitable surface roughness measurement devices 134 include non-contacting optical profilometers, contacting stylus profilometers (e.g., skidded or skidless gauges), or other applicable devices. Surface roughness measurements can be taken in real-time and used by the controller 132 to adjust the thickness of the applied wax layer.

In some cases, the metal substrate 102 can include one or more conversion layers, as described in further detail below, pre-applied prior to entering the pre-heating furnace 114 or the lamination system 116.

In some cases, a lubricant can be further applied to the prepared metal product 112 after exiting the furnace 122.

FIG. 2 is a close-up side view of the prepared metal product 112 of FIG. 1 according to certain aspects of the present disclosure. The prepared metal product 112 includes metal substrate 102 sandwiched between a layer of lacquer 128 and a wax-roughened polymer film 126. In some cases, residual wax 130 may exist on the surface of the wax-roughened polymer film 126, however that need not be the case.

In some cases, to prepare the aluminum to provide enhanced adhesion and blushing performance, one or more conversion layers 202 optionally may be applied on bare aluminum. In some cases, this layer 202 can include components of chromium(III), chromium(VI), titanium, zirconium, and phosphates. This layer 202 can provide enhanced adhesion, low blushing after pasteurization, and good corrosion performance in the acetic acid test. In some cases, the metal substrate 102 can include one or more conversion layers 202 located between one or both of the layer of lacquer 128 and wax-roughened polymer film 126.

FIG. 3 is a flowchart depicting a process 300 for preparing a waxed and laminated metal product according to certain aspects of the present disclosure. A waxed and laminated metal product can refer to a metal substrate that has been laminated and annealed, and thereafter waxed. At block 302, a polymer film can be applied to the metal substrate, such as described above with reference to the lamination system 116 of FIG. 1. However, prior to having wax applied thereto, the metal substrate can be annealed at block 304. After annealing the metal substrate, wax can be applied to the metal substrate at block 306, thus forming the waxed and laminated metal product. In some cases, applying wax at block 306 may include heating the metal substrate to a relatively low temperature (e.g., 80° C.) that is substantially lower than the melting point ($T_m$) of the polymer film. When applied as seen in process 300, the wax layer will be a relatively smooth layer. A wax layer can provide friction-reducing benefits. However, because annealing takes place prior to application of the wax, the surface of the polymer film will not be further roughened by the wax substantially or at all. Thus, the waxed and laminated metal product can have a surface that is relatively smooth.

FIG. 4 is a flowchart depicting a process 400 for preparing a laminated metal product with a wax-roughened surface according to certain aspects of the present disclosure. A laminated metal product with a wax-roughened surface can include a metal substrate that has been laminated and to which wax has been applied prior to an annealing or otherwise sufficient heating step (e.g., sufficient to heat the polymer to a melting temperature of at least the outer layer of the polymer). At block 402, a polymer film can be applied to a metal substrate, such as described above with reference to the lamination system 116 of FIG. 1. In contrast to process 300 of FIG. 3, wax is applied to the metal substrate at bloc 404 to form a metal product, prior to the metal product being annealed at block 406. In some cases, heating can occur at block 406 other than annealing as long as the polymer film or at least an outer layer of the polymer film is heated to a temperature at or above a melting temperature ($T_m$) of the polymer film or outer layer of the polymer film.

In contrast to the waxed and laminated metal product from the process 300 of FIG. 3, the laminated metal product with a wax-roughened surface produced by the process 400 of FIG. 4 has a polymer film with improved roughness due to the interaction of the wax layer and the polymer film during the heating at block 406.

Application of wax to the metal substrate at block 404 to form a metal product can include applying wax through any suitable technique, such as applying wax as a waterborne dispersion of wax. The wax layer can be applied using a roll coating device, a bar coating device, an electrostatic application device, or other device. In some cases, the amount of wax added can be determined based on the desired roughness profile for the metal product (e.g., the desired roughness profile for the polymer film).

Heating (e.g., annealing) the metal product at block 406 can be performed in any suitable fashion. In some cases, indirect or non-contact heating can be desirable or preferable so as to not affect the surface roughness due to contact from a heating device. Heat can be applied to the polymer film through the metal product or from above the metal product. In some cases, the metal product can be positioned horizontally such that the wax layer faces upwards, thus allowing gravity to aid in pulling molten wax towards the molten polymer film when heated. In such cases, to provide a laminated and wax-roughened surface on both sides of the metal product, the metal product can be flipped to apply and/or heat a wax layer on a second polymer film on a second side of the metal product (e.g., opposite the metal product from a first polymer film).

FIG. 5 is a chart 500 depicting estimated temperature profiles for a waxed and laminated metal product (such as one produced using the process 300 of FIG. 3) and a laminated metal product with a wax-roughened surface (such as one produced using the process 400 of FIG. 4) according to certain aspects of the present disclosure. The temperatures depicted in chart 500 are shown as examples, although other temperatures may be used. Both products can pass through a lamination process during which the metal substrate can be heated (e.g., to approximately 200° C.) to laminate the polymer film to the metal substrate.

After lamination, the precursor metal product to the waxed and laminated metal product (e.g., a laminated metal substrate) can go through an annealing process at an elevated temperature (e.g., to approximately 295° C.) and thereafter become waxed. During waxing, the metal substrate can be raised to a moderate temperature (e.g., to approximately 80° C.) to melt the wax and not the polymer film, which can facilitate providing an even coating of wax. After the wax has been applied to the metal substrate to form a metal product, the metal product is not thereafter heated to a temperature above the melting temperature ($T_m$) of the polymer film. Between lamination, annealing, and waxing, the metal product can be allowed to cool to a relatively low temperature, such as an ambient temperature (e.g., room temperature and/or ambient conditions). The resultant metal product is a waxed and laminated metal product.

In contrast to the waxed and laminated metal product, the precursor metal product to the laminated metal product with a wax-roughened surface can undergo lamination, followed by waxing, followed by annealing or other heating. After lamination, the precursor metal product (e.g., a laminated metal substrate) can undergo waxing, which can include raising the temperature of the precursor metal product to a moderate temperature (e.g., to approximately 80° C.). After waxing, the metal product can undergo annealing or other heating at an elevated temperature (e.g., to approximately 265° C.). During annealing or other heating, the metal product can be heated to a temperature at or above a melting temperature ($T_m$) of the polymer film. Between lamination, annealing, and waxing, the metal product can be allowed to cool to a relatively low temperature, such as an ambient temperature. The resultant metal product is a laminated metal product with a wax-roughened surface.

Various experiments were performed to examine surface roughness of laminated metal products. In an example, a single aluminum metal substrate was laminated according to four variants. In a first variant, the metal substrate was laminated and annealed prior to having a polyethylene wax applied thereto, similar to process 300 of FIG. 3. In a second variant, the metal substrate was laminated and annealed prior to having a carnauba wax applied thereto, similar to process 300 of FIG. 3. In a third variant, the metal substrate was laminated, waxed with a polyethylene wax, and then annealed, similar to process 400 of FIG. 4. In a fourth variant, the metal substrate was laminated, waxed with a carnauba wax, and then annealed, similar to process 400 of FIG. 4. These four variants are summarized in Table 1.

TABLE 1

| Variant | First Pass | Second Pass | Third Pass |
| --- | --- | --- | --- |
| First Variant | Lamination | Annealing | Application of Polyethylene Wax |
| Second Variant | Lamination | Annealing | Application of Carnauba Wax |
| Third Variant | Lamination | Application of Polyethylene Wax | Annealing |
| Fourth Variant | Lamination | Application of Carnauba Wax | Annealing |

FIG. 6 is a scanning electron micrograph 600 of a metal product that is a waxed and laminated metal product according to a first variant according to certain aspects of the present disclosure. The surface of the metal product seen in micrograph 600 is relatively smooth. The metal product depicted in micrograph 600 was laminated and annealed prior to having a polyethylene wax applied thereto, similar to process 300 of FIG. 3.

Figure 7:
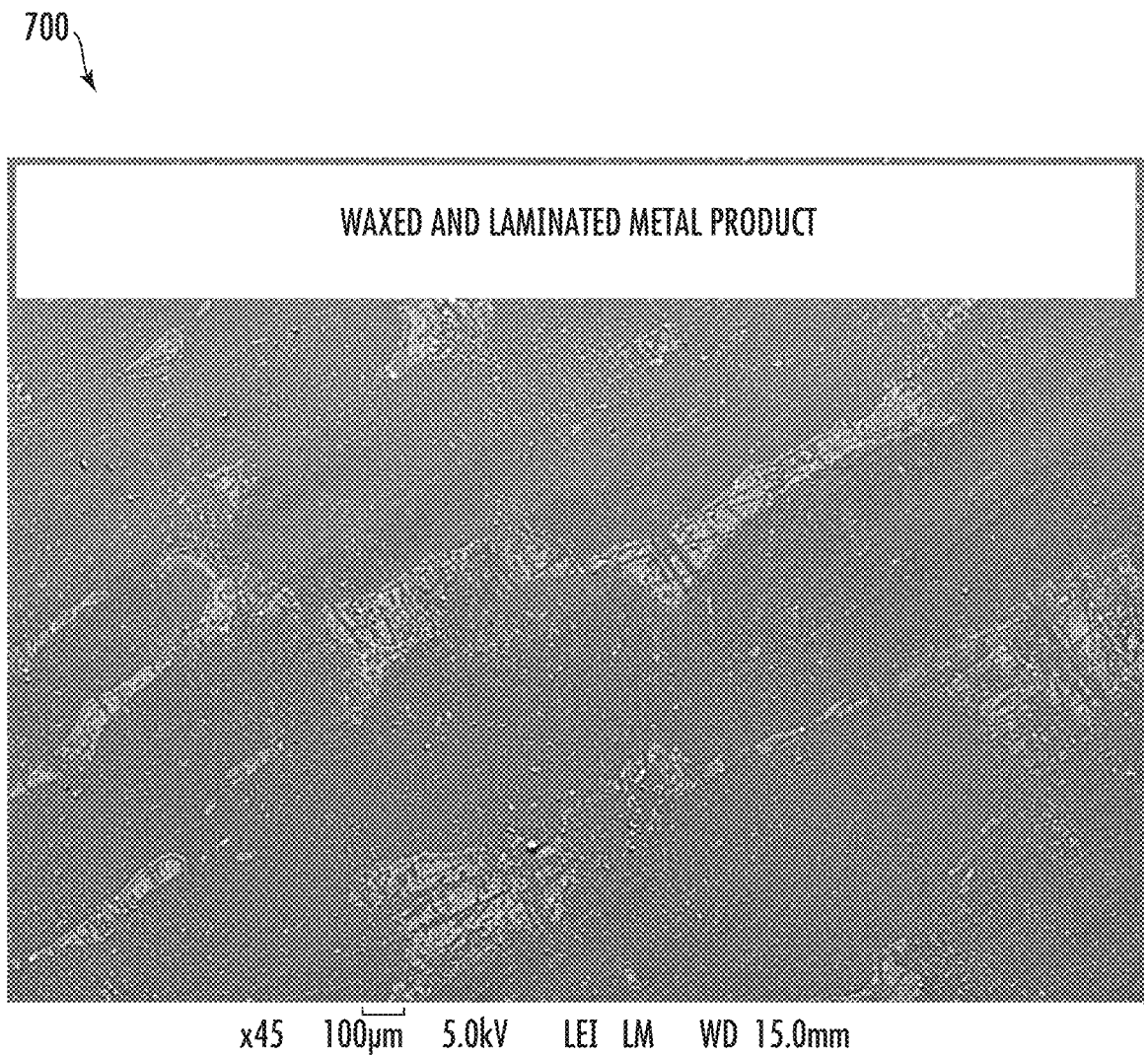
FIG. 7 is a scanning electron micrograph of a waxed and laminated metal product according to a second variant according to certain aspects of the present disclosure.

FIG. 7 is a scanning electron micrograph 700 of a metal product that is a waxed and laminated metal product according to a second variant according to certain aspects of the present disclosure. The surface of the metal product seen in micrograph 700 is relatively smooth. The metal product depicted in micrograph 700 was laminated and annealed prior to having a carnauba wax applied thereto, similar to process 300 of FIG. 3.

Figure 8:
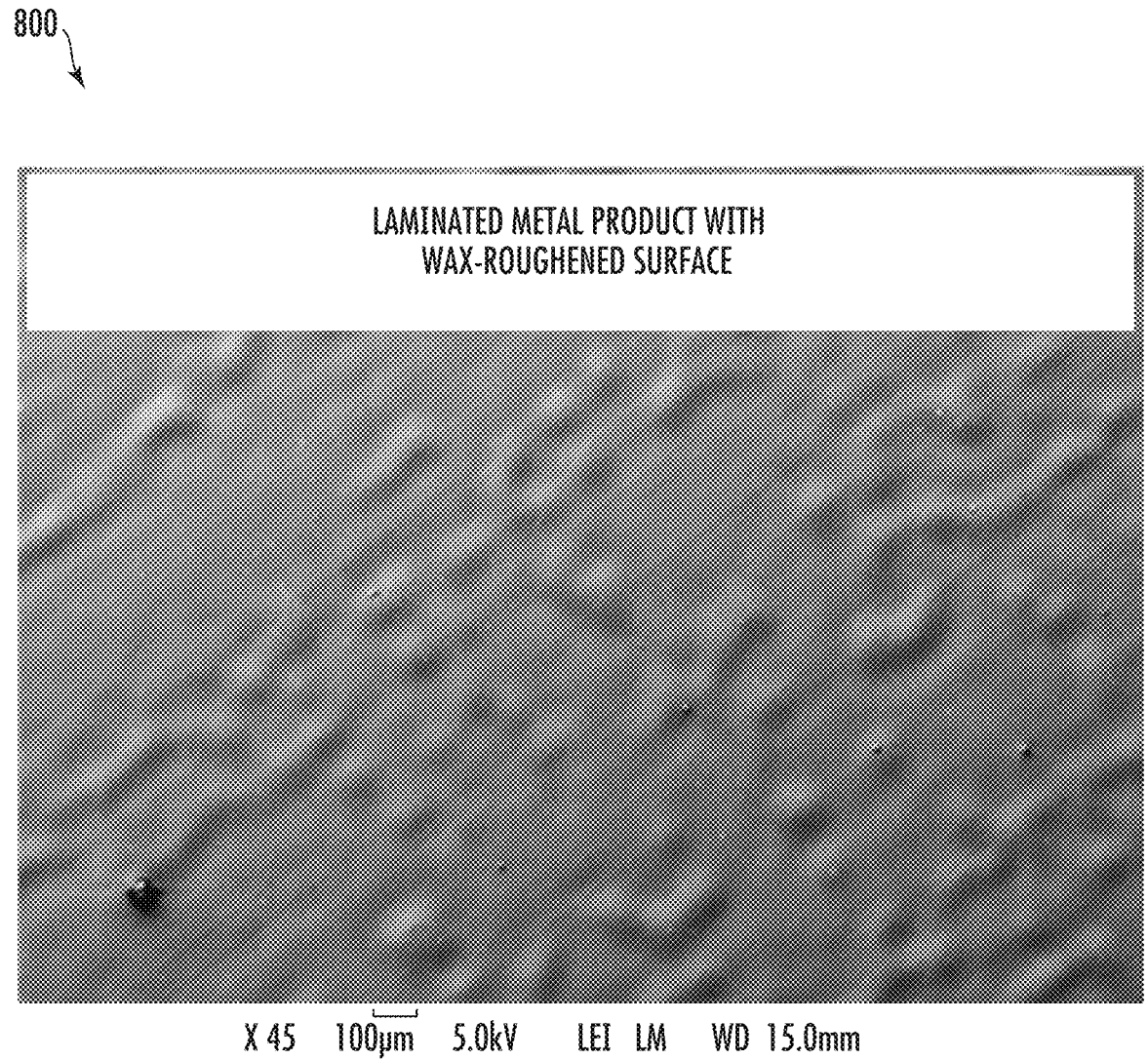
FIG. 8 is a scanning electron micrograph of a laminated metal product with a wax-roughened surface according to a third variant according to certain aspects of the present disclosure.

FIG. 8 is a scanning electron micrograph 800 of a metal product that is a laminated metal product with a wax-roughened surface according to a third variant according to certain aspects of the present disclosure. The surface of the metal product seen in micrograph 800 shows improved roughness, especially as compared to the waxed and laminated metal products of micrographs 600, 700 of FIGS. 6 and 7. The metal product depicted in micrograph 800 was laminated, waxed using polyethylene wax, and then annealed, similar to process 400 of FIG. 4.

Figure 9:
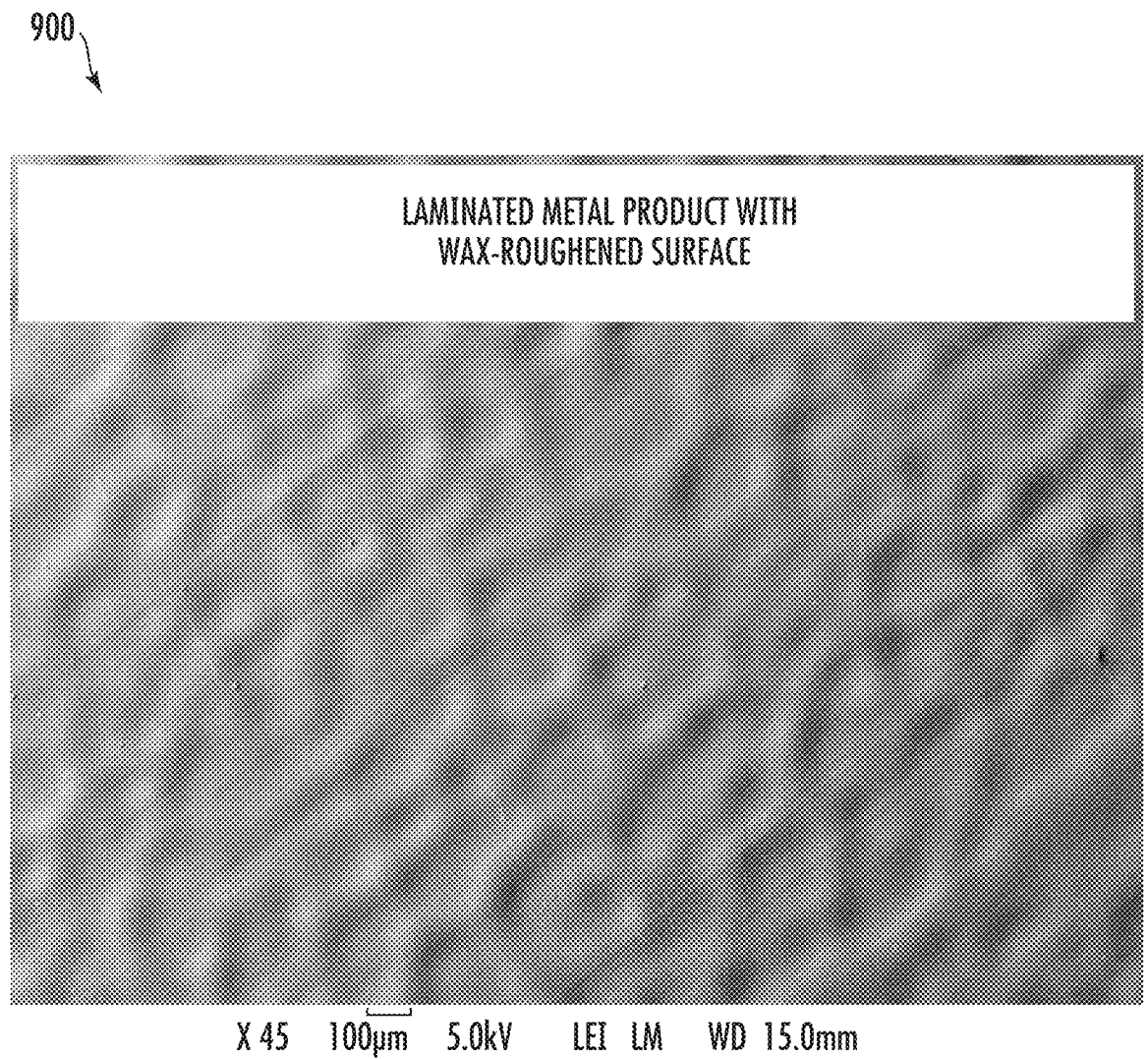
FIG. 9 is a scanning electron micrograph of a laminated metal product with a wax-roughened surface according to a fourth variant according to certain aspects of the present disclosure.

FIG. 9 is a scanning electron micrograph 900 of a metal product that is a laminated metal product with a wax-roughened surface according to a fourth variant according to certain aspects of the present disclosure. The surface of the metal product seen in micrograph 900 shows improved roughness, especially as compared to the waxed and laminated metal products of micrographs 600, 700 of FIGS. 6 and 7. The metal product depicted in micrograph 900 was laminated, waxed using carnauba wax, and then annealed, similar to process 400 of FIG. 4.

Figure 10:
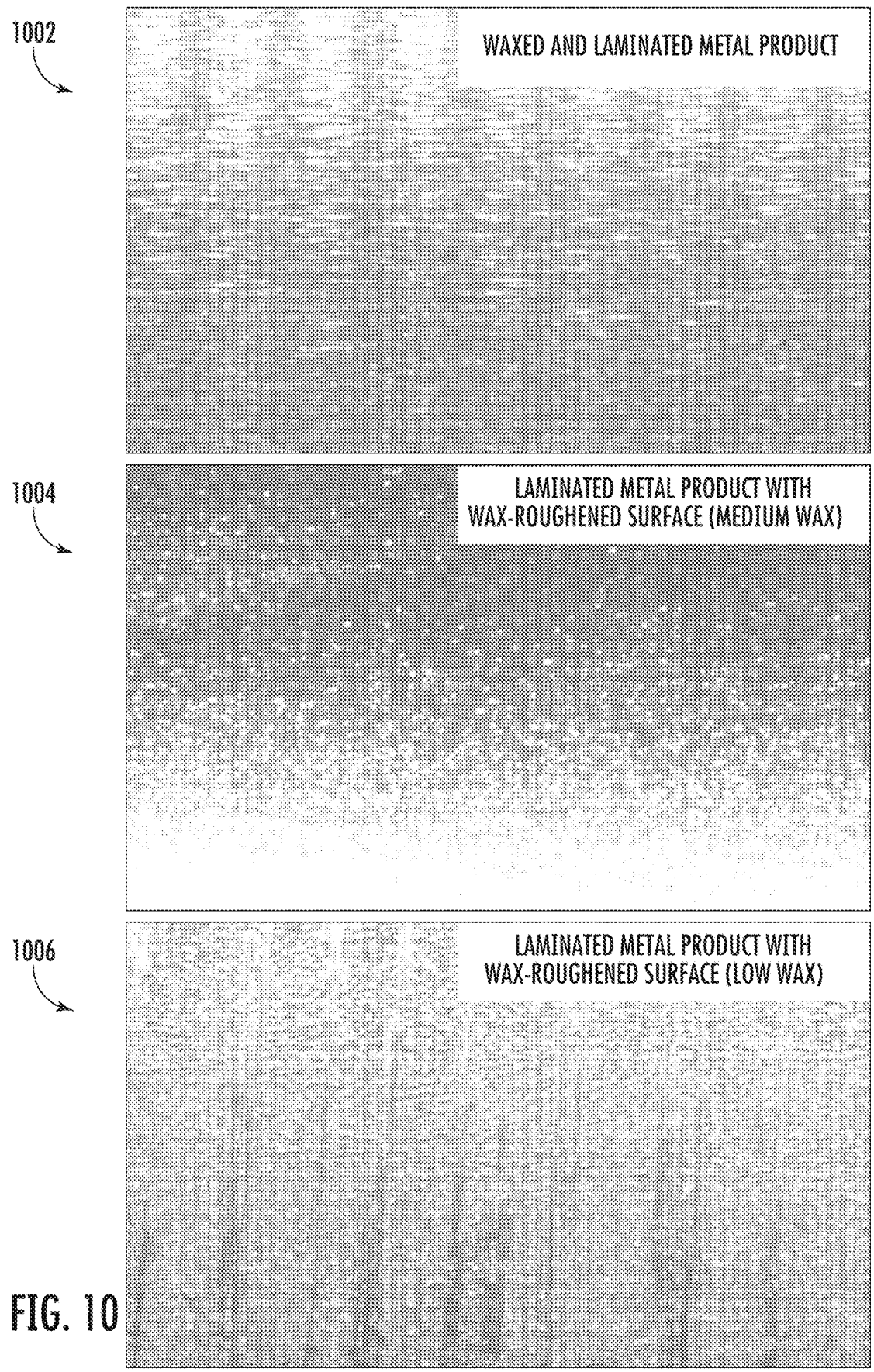
FIG. 10 is a set of optical micrographs of metal products according to certain aspects of the present disclosure.

FIG. 10 is a set of optical micrographs 1002, 1004, 1006 of metal products according to certain aspects of the present disclosure. Micrograph 1002 depicts a close up view of a surface of a waxed and laminated metal product, such as a metal product according to the first variant or second variant, showing a relatively smooth surface. Micrograph 1004 depicts a close up view of a surface of a laminated metal product, such as a metal product according to a third variant or fourth variant, with a wax-roughened surface after the use of a medium quantity (e.g., 30-50 mg/m²) of wax. As seen in micrograph 1004, the surface shows somewhat improved roughness as compared to the surface seen in micrograph 1002.

Micrograph 1006 depicts a close up view of a surface of a laminated metal product, such as a metal product according to a third variant or fourth variant, with a wax-roughened surface after the use of a low quantity (e.g., 10-25 mg/m²) of wax. As seen in micrograph 1006, the surface shows further improved roughness as compared to the surfaces seen in micrograph 1002 and micrograph 1004. Through experimentation, it has been found that small amounts of wax can provide more roughness improvement than if larger quantities of wax are used. For example, it can be desirable to provide a layer of wax on the order of tens or hundreds of nanometers thick. In some cases, a layer of wax can be provided to a thickness of at least 25 nm, 30 nm, 35 nm, 40 nm, or 45 nm and no more than 90 nm, 100 nm, 110 nm, 120 nm, 130 nm, 140 nm, 150 nm, 160 nm, 170 nm, 180 nm, 190 nm, or 200 nm. In some cases, a layer of wax can be provided to a thickness within the ranges of 25-200 nm, 25-100 nm, or 40-90 nm. In some cases, the amount of wax provided can be on the order of ones or tens of milligrams of wax per square meter. In some cases, a layer of wax can be provided in amounts greater than 1 mg/m², 2 mg/m², 3 mg/m², 4 mg/m², 5 mg/m², 6 mg/m², 7 mg/m², 8 mg/m², 9 mg/m², or 10 mg/m², and less than 50 mg/m², 45 mg/m², 40 mg/m², 35 mg/m², 30 mg/m², 25 mg/m², 20 mg/m², 15 mg/m², or 10 mg/m². In some cases, a layer of wax can be provided in amounts between 10-25 mg/m². Other limits and ranges can be used.

Figure 11:
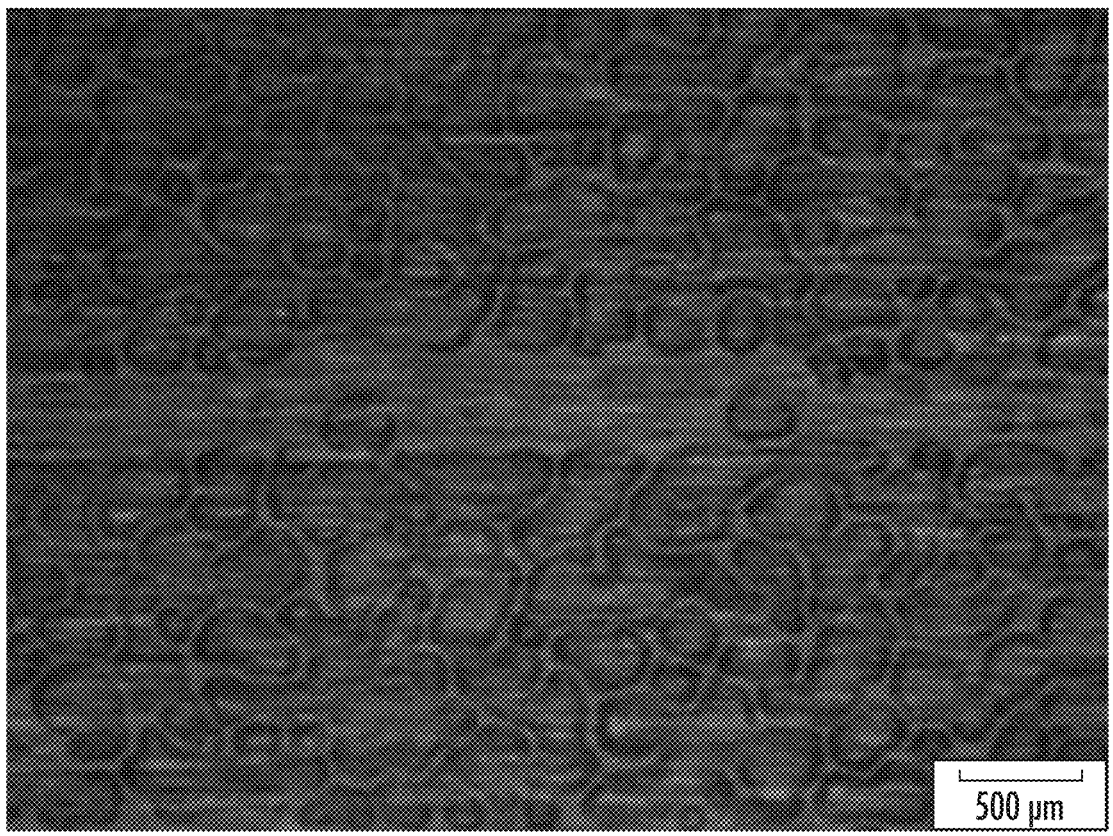
FIG. 11 is an optical micrograph taken with polarized light of the surface of a laminated metal product with a wax-roughened surface according to certain aspects of the present disclosure.

FIG. 11 is an optical micrograph 1100 taken with polarized light of the surface of a metal product that is a laminated metal product with a wax-roughened surface according to certain aspects of the present disclosure. The surface of the metal product is shown having a strongly visible wrinkle structure, showing a surface with improved roughness, at least as compared to a waxed and laminated metal product. The metal product depicted in optical micrograph 1100 was laminated, waxed, and then annealed, similar to process 400 of FIG. 4.

Figure 12:
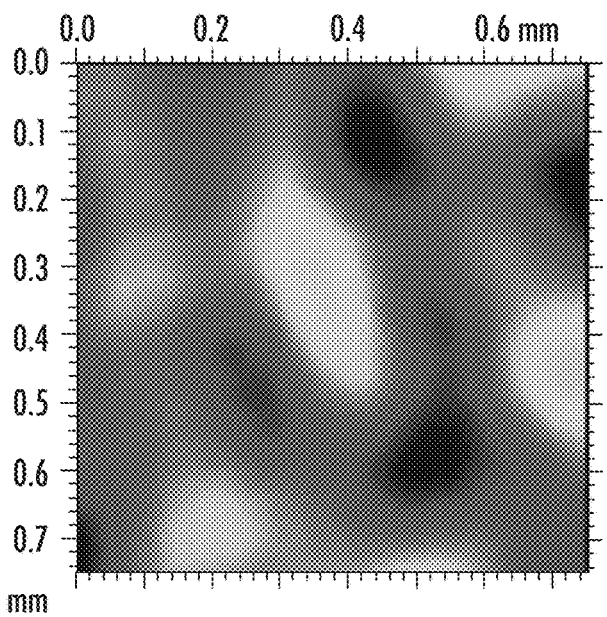
FIG. 12 is a confocal micrograph depicting the surface of a waxed and laminated metal product according to certain aspects of the present disclosure.

FIG. 12 is a confocal micrograph 1200 depicting the surface of a waxed and laminated metal product according to certain aspects of the present disclosure. As seen in the micrograph 1200, the metal product has a mostly uniform surface with low roughness. The metal product depicted in confocal micrograph 1200 was laminated and annealed prior to having a wax applied thereto, similar to process 300 of FIG. 3.

Figure 13:
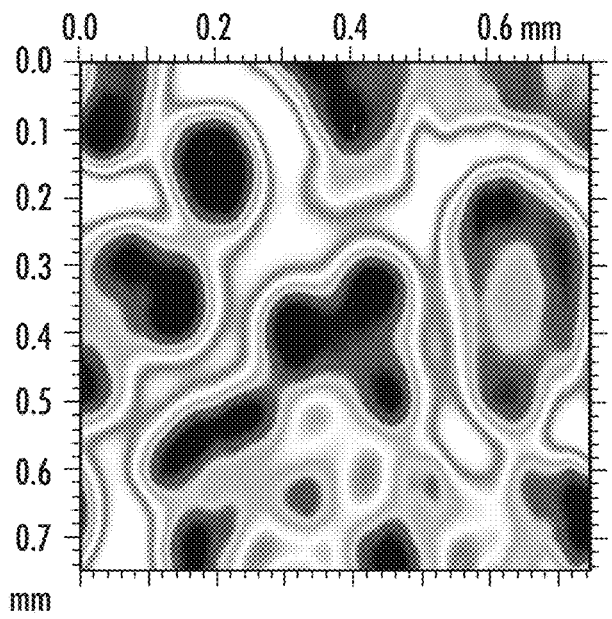
FIG. 13 is a confocal micrograph depicting the surface of a laminated metal product with a wax-roughened surface according to certain aspects of the present disclosure.

FIG. 13 is a confocal micrograph 1300 depicting the surface of a laminated metal product with a wax-roughened surface according to certain aspects of the present disclosure. As seen in the micrograph 1300, the metal product has a strongly visible wrinkle structure evidencing the improved roughness, at least as compared to the surface of the waxed and laminated metal product depicted in micrograph 1200 of FIG. 12. The metal product depicted in confocal micrograph 1100 was laminated, waxed, and then annealed, similar to process 400 of FIG. 4.

Measurements based on micrograph 1200 of FIG. 12 and micrograph 1300 of FIG. 13 are shown in Table 2.

TABLE 2

| Roughness Parameter | Waxed and Laminated Metal Product | Laminated Metal Product with a Wax-Roughened Surface |
|---|---|---|
| $S_a$ (Roughness Average) | 1.45 μm | 2.89 μm |
| $S_p$ (Maximum Peak Height) | 4.02 μm | 18.4 μm |
| $S_v$ (Maximum Valley Depth) | 4.12 μm | 27.2 μm |

The waxed and laminated metal product of FIG. 12 shows low average surface roughness, low maximum peak height, and low maximum valley depth. In contrast, the laminated metal product with a wax-roughened surface shows a higher roughness average (e.g., approximately double that of the waxed and laminated metal product), a substantially improved maximum peak height (e.g., higher value than that of the waxed and laminated metal product), and a substantially improved maximum valley depth (e.g., higher value than that of the waxed and laminated metal product). In some cases, a desirable metal product can have a roughness average ($S_a$) that is at or greater than approximately 1.5, 1.6, 1.7, 1.8, 1.9, 2, 2.1, 2.2, 2.3, 2.4, 2.5, 2.6, 2.7, or 2.8 μm.

Figure 14:
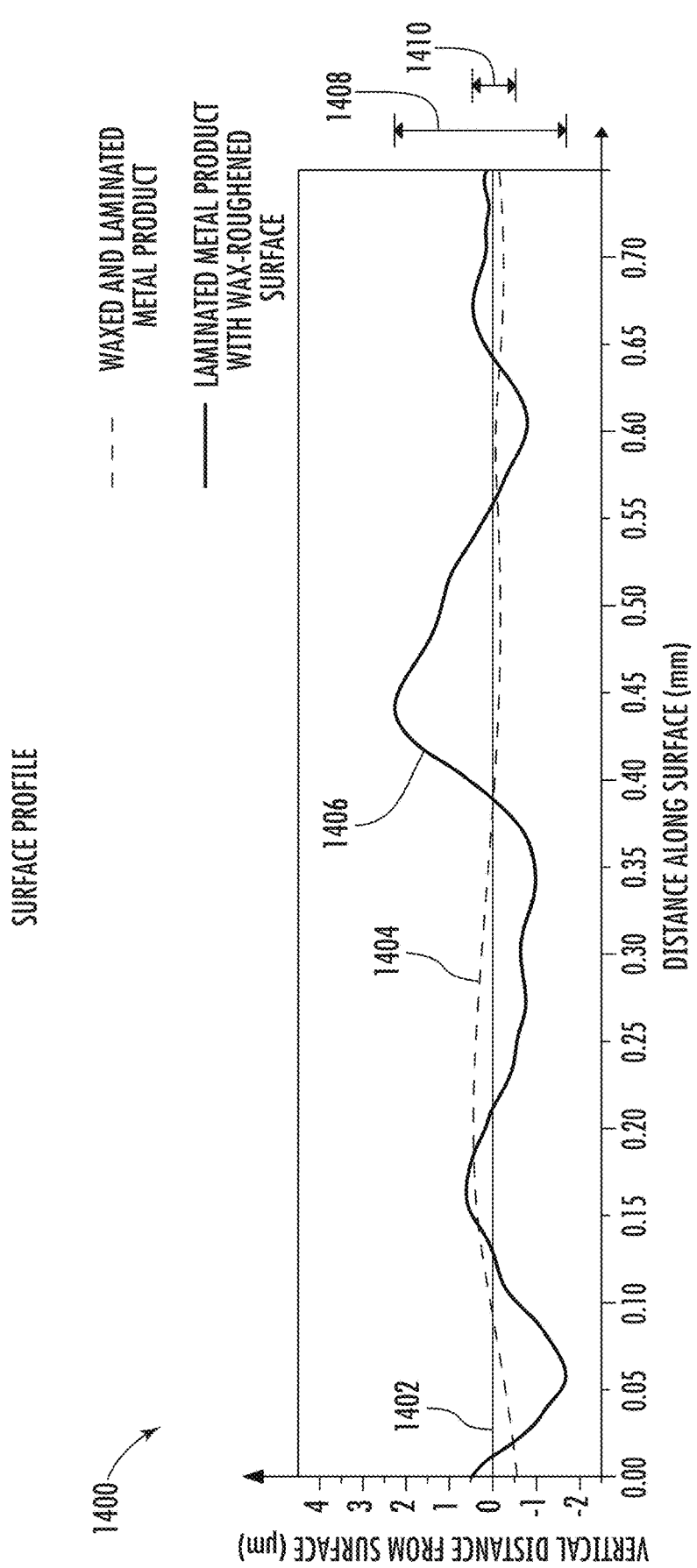
FIG. 14 is a chart depicting the surface profile of a waxed and laminated metal product as compared to the surface profile of a laminated metal product with a wax-roughened surface according to certain aspects of the present disclosure.

FIG. 14 is a chart 1400 depicting the surface profile of a waxed and laminated metal product 1404 (such as one produced from process 300 of FIG. 3) as compared to the surface profile of a laminated metal product with a wax-roughened surface 1406 (such as one produced from process 400 of FIG. 4) according to certain aspects of the present disclosure. The chart 1400 depicts an average surface line 1402 identifying the average location of the surface of the metal product, such as the surface of polymer film or the surface of the outer layer of the polymer film. The surface profile of the waxed and laminated metal product 1404 deviates from the average surface line 1402 by small amounts (e.g., a roughness average of less than 1 μm) and has a relatively small maximum roughness depth 1410.

By contrast, the surface profile of the laminated metal product with a wax-roughened surface 1406 deviates from the average surface line 1402 by larger amounts (e.g., a roughness average of more than 1 μm) and has a relatively larger maximum roughness depth 1408.

FIG. 15 is an optical micrograph 1500 depicting a side elevation of a laminated metal product with a wax-roughened surface according to certain aspects of the present disclosure. The laminated metal product with a wax-roughened surface can include a metal substrate 1502 and a polymer film made of a core layer 1504 and an outer layer 1506. As seen in micrograph 1500, the outer layer 1506 has been roughened after the wax layer had been applied and both the wax layer and the polymer film had been heated to a temperature above the melting point of the polymer film or a melting point of the outer layer 1506 of the polymer film. In some cases, the exposed surface of the laminated metal product with a wax-roughened surface can show portions of the core layer 1504 of the polymer film and/or portions of the outer layer 1506 of the polymer film.

FIG. 16 is a set of optical micrographs 1600, 1601 depicting the side elevation of the laminated metal product with the wax-roughened surface of FIG. 15 according to certain aspects of the present disclosure. The laminated metal product with a wax-roughened surface can include a metal substrate 1502 and a polymer film made of a core layer 1504 and an outer layer 1506.

Figure 17:
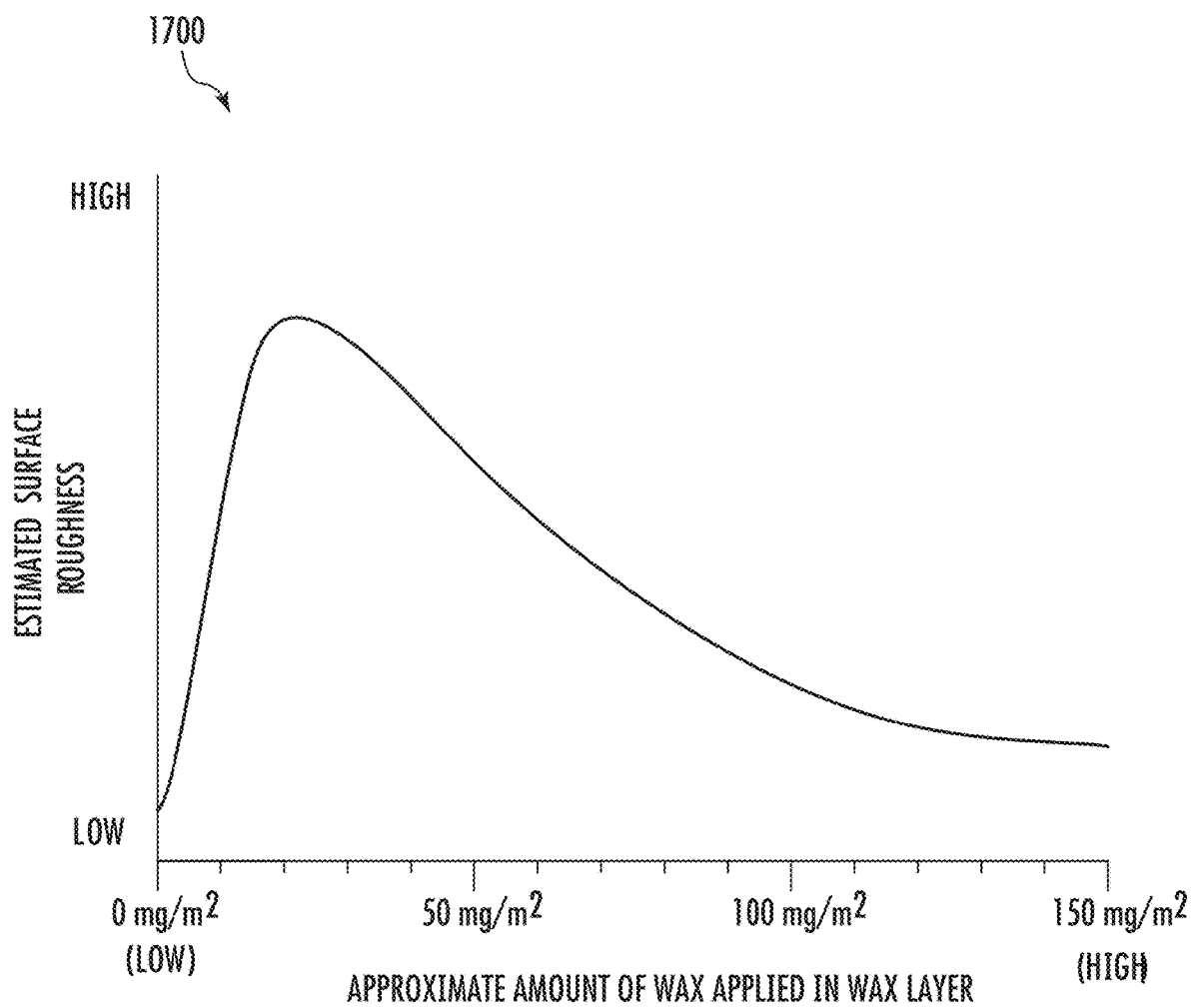
FIG. 17 is a chart depicting an estimated surface roughness as compared to an approximate amount of applied wax of a laminated metal product with a wax-roughened surface according to certain aspects of the present disclosure.

FIG. 17 is a chart 1700 depicting an estimated surface roughness as compared to an estimated amount of applied wax of a laminated metal product with a wax-roughened surface according to certain aspects of the present disclosure. Chart 1700 depicts dimensionless amounts of surface roughness and an approximate amount of applied wax in mg/m². Up to a small amount of wax (e.g., between approximately 10-25 mg/m²) applied, the increase in surface roughness improves. After a point, the improvement in surface roughness drops as additional wax is added.

Figure 18:
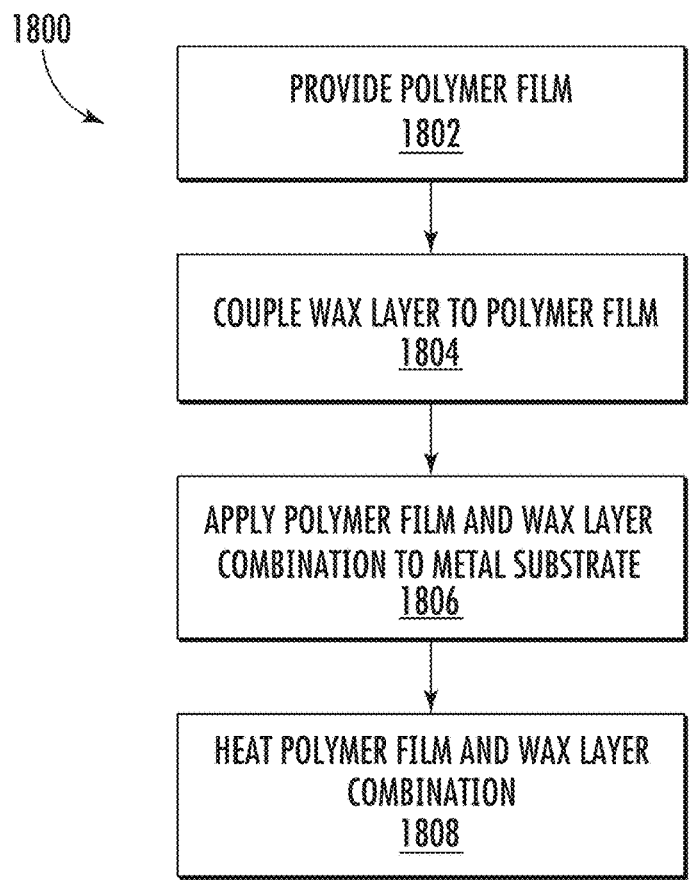
FIG. 18 is a flowchart depicting a process for preparing a laminated metal product with a wax-roughened surface using a polymer film and wax layer combination according to certain aspects of the present disclosure.

FIG. 18 is a flowchart depicting a process 1800 for preparing a laminated metal product with a wax-roughened surface using a polymer film and wax layer combination according to certain aspects of the present disclosure. At block 1802, a polymer film can be provided. At block 1804, a wax layer can be coupled to a polymer film to create a polymer film and wax layer combination. At block 1806, the polymer film and wax layer combination can be applied to the metal substrate. In some cases, the wax layer can be cooled or heat can be applied opposite the polymer film from the wax layer to ensure the wax is not prematurely separated from the polymer film upon applying the polymer film to the metal substrate. At block 1808, the polymer film and wax layer combination can be heated to a temperature at or above a melting temperature of the polymer film.

Figure 19:
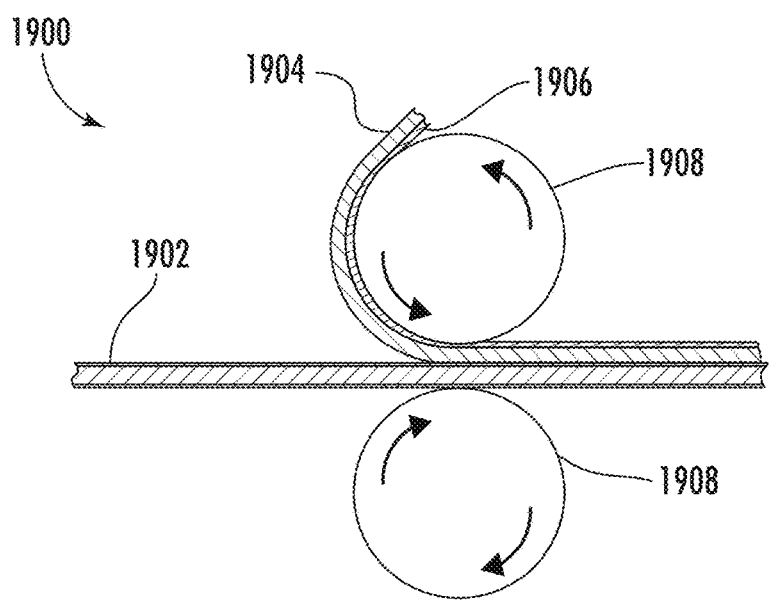
FIG. 19 is a schematic diagram depicting a system for preparing a laminated metal product with a wax-roughened surface using a polymer film and wax layer combination according to certain aspects of the present disclosure.

FIG. 19 is a schematic diagram depicting a system 1900 for preparing a laminated metal product with a wax-roughened surface using a polymer film and wax layer combination according to certain aspects of the present disclosure. The system 1900 can be set up to perform block 1806 of the process 1800 of FIG. 18. A metal substrate 1902 can pass through a set of application rollers 1908. A polymer film 1904 with a wax layer 1906 coupled thereto can be pressed against the metal substrate 1902.

Figure 20:
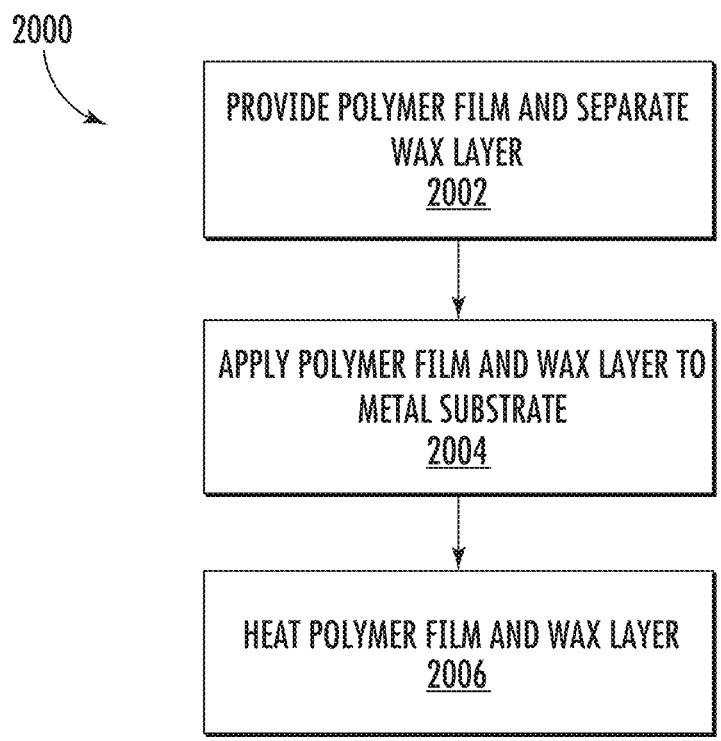
FIG. 20 is a flowchart depicting a process for preparing a laminated metal product with a wax-roughened surface using a polymer film and wax layer during lamination according to certain aspects of the present disclosure.

FIG. 20 is a flowchart depicting a process 2000 for preparing a laminated metal product with a wax-roughened surface using a polymer film and wax layer during lamination according to certain aspects of the present disclosure. At block 2002, a polymer film and a wax layer can be provided as separate layers (e.g., non-coupled layers). At block 2004, the polymer film can be applied to the metal substrate at the same time the wax layer is applied to the polymer film. At block 2006, the polymer film and the wax layer can be heated to a temperature at or above a melting temperature of the polymer film.

Figure 21:
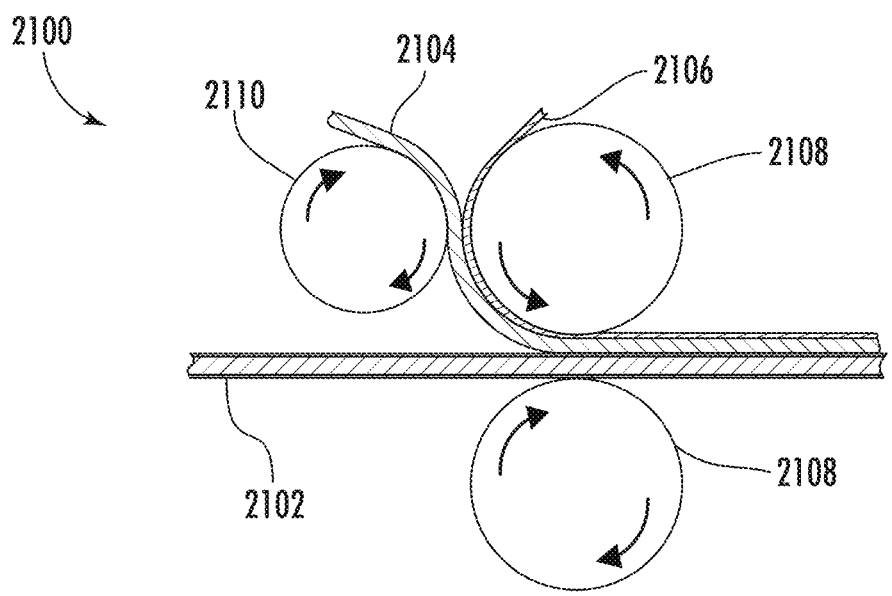
FIG. 21 is a schematic diagram depicting a system for preparing a laminated metal product with a wax-roughened surface using a polymer film and wax layer during lamination according to certain aspects of the present disclosure.

FIG. 21 is a schematic diagram depicting a system 2100 for preparing a laminated metal product with a wax-roughened surface using a polymer film and wax layer during lamination according to certain aspects of the present disclosure. The system 2100 can be set up to perform block 2004 of the process 2000 of FIG. 20. A metal substrate 2102 can pass through a set of application rollers 2108 to apply the polymer film 2104 to the metal substrate 2102 and the wax layer 2106 to the polymer film 2104. The polymer film 2104 and wax layer 2106 can be provided separately and brought together prior to application to the metal substrate 2102. In some cases, an additional roller 2110 can press the polymer film 2104 to the wax layer 2106 immediately prior to application to the metal substrate 2102.

Figure 22:
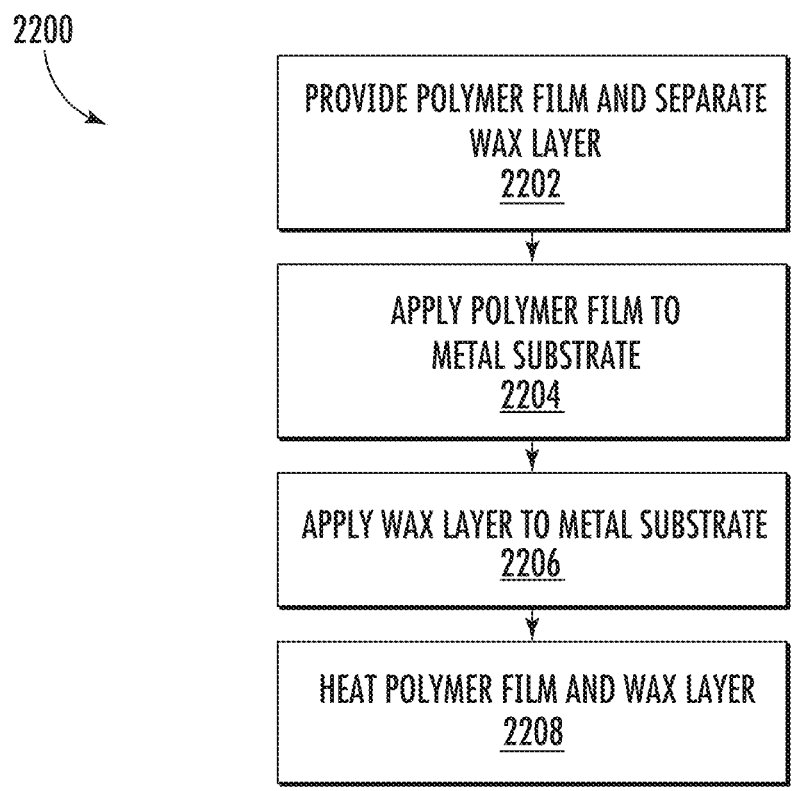
FIG. 22 is a flowchart depicting a process for preparing a laminated metal product with a wax-roughened surface by applying a wax layer after lamination according to certain aspects of the present disclosure.

FIG. 22 is a flowchart depicting a process 2200 for preparing a laminated metal product with a wax-roughened surface by applying a wax layer after lamination according to certain aspects of the present disclosure. At block 2202, a polymer film and a wax layer are provided. At block 2204, the polymer film is applied to the metal substrate. In some cases, the polymer film can be heated to the metal substrate to couple or laminate the polymer film to the metal substrate. At block 2206, a wax layer can be applied to the laminated metal substrate. In some cases, the wax layer can be applied as a waterborne wax that is roll coated, sprayed, or otherwise applied to the laminated metal substrate. At block 2208, the polymer film and wax layer can be heated to a temperature at or above a melting temperature of the polymer film. In some cases, blocks 2206 and 2208 can occur simultaneously or in rapid succession.

Figure 23:
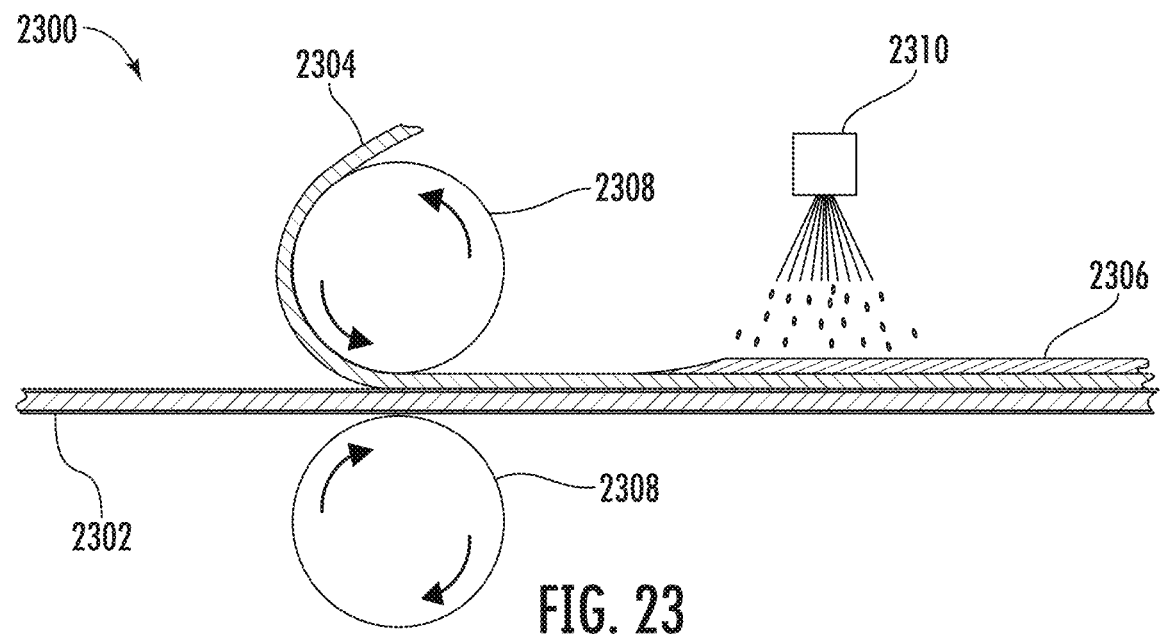
FIG. 23 is a schematic diagram depicting a system for preparing a laminated metal product with a wax-roughened surface by applying a wax layer after lamination according to certain aspects of the present disclosure.

FIG. 23 is a schematic diagram depicting a system 2300 for preparing a laminated metal product with a wax-roughened surface by applying a wax layer 2306 after lamination according to certain aspects of the present disclosure. A metal substrate 2302 can pass through a set of application rollers 2308 to apply the polymer film 2304 to the metal substrate 2302. After the polymer film 2304 has been applied to the metal substrate, and optionally heated and cooled again, a wax layer 2306 can be applied to the surface of the polymer film 2304. System 2300 depicts a spray header 2310 having one or more nozzles for distributing a waterborne wax onto the polymer layer 2304 as a wax layer 2306.

Examples of Suitable Products, Methods, and Systems

As used below, any reference to a series of examples is to be understood as a reference to each of those examples disjunctively (e.g., "Examples 1-4" is to be understood as "Examples 1, 2, 3, or 4").

Example 1 is a method for preparing a metal product, comprising: applying a polymer film to a surface of a metal substrate; applying a layer of wax to an outer layer of the polymer film; and heating the polymer film and the layer of wax to a temperature above a melting temperature of the polymer film.

Example 2 is the method of example 1, wherein applying the layer of wax comprises distributing a volume of waterborne wax using a roll coater or a spray header.

Example 3 is the method of examples 1 or 2, wherein applying the layer of wax comprises applying a layer of wax at a thickness of from about 25 nm to about 100 nm.

Example 4 is the method of examples 1-3, wherein applying the layer of wax comprises applying a layer of wax at a coating weight of from about 10 mg/m² to about 25 mg/m².

Example 5 is the method of examples 1-4, wherein applying the layer of wax to the outer layer of the polymer film occurs prior to applying the polymer film to the surface of the metal substrate.

Example 6 is the method of examples 1-5, wherein heating the polymer film and the layer of wax to the temperature above the melting temperature of the polymer film comprises heating the polymer film and the layer of wax above a melting temperature of an outer layer of the polymer film.

Example 7 is the method of examples 1-6, further comprising: measuring a surface roughness parameter of the polymer film after heating the polymer film and the layer of wax; and adjusting a thickness of the layer of wax using the measured surface roughness parameter.

Example 8 is a metal product prepared according to the method of examples 1-7.

Example 9 is a metal product, comprising a polymer film attached to a surface of a metal substrate, wherein an outer layer of the polymer film facing away from the metal substrate has a roughness average of at least about 2 µm; and a layer of wax adhered to the outer layer of the polymer film Example 10 is the metal product of example 9, wherein the layer of wax comprises a thickness of from about 25 nm to about 100 nm.

Example 11 is the metal product of example 9 or 10, wherein the layer of wax comprises a coating weight of from about 10 mg/m² to about 25 mg/m².

Example 12 is the metal product of examples 9-11, wherein the metal substrate comprises an aluminum alloy.

Example 13 is the metal product of example 12, wherein the aluminum alloy comprises a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy.

Example 14 is the metal product of examples 9-13, wherein the polymer film comprises polyethylene terephthalate.

Example 15 is the metal product of examples 9-14, wherein the layer of wax comprises a layer of a polyethylene wax or a layer of a carnauba wax.

Example 16 is a system, comprising a lamination system for applying a polymer film to a surface of a metal substrate; a wax application system positioned downstream of the lamination system for accepting the metal substrate and applying a wax layer to an outer layer of the polymer film, the outer layer facing away from the metal substrate, to form a metal product; and a furnace positioned downstream of the wax application system for accepting the metal product and raising a temperature of the wax layer and the polymer film at least above a melting temperature of the outer layer of the polymer film.

Example 17 is the system of example 16, further comprising a supply of waterborne wax coupled to the wax application system, wherein the wax application system comprises a roll coater or a spray header fluidly coupled to the supply of waterborne wax.

Example 18 is the system of examples 16 or 17, wherein the wax application system is configured to apply the wax layer at a thickness of from about 25 nm to about 100 nm.

Example 19 is the system of examples 16-18, wherein the wax application system is configured to apply the wax layer at a coating weight of from about 10 mg/m² to about 25 mg/m².

Example 20 is the system of examples 16-19, further comprising: a surface roughness measurement device positioned downstream of the furnace; and a controller coupled to the surface roughness measurement device and the wax application system to adjust a thickness of the wax layer applied by the wax application system in response to measurements from the surface roughness measurement device.

Example 21 is the system of examples 16-20, wherein the wax application system is configured to apply the wax at a thickness that results in a surface roughness measurement of at least about 2 μm.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A method for preparing a metal product, comprising: applying a polymer film to a surface of a metal substrate; then applying a layer of wax to an outer layer of the polymer film at a coating weight of from 10 mg/m² to less than 20 mg/m² and at a thickness of from 25 nm to 100 nm; and heating the polymer film and the layer of wax to a temperature above a melting temperature of the polymer film to result in the metal product, wherein the temperature above the melting temperature of the polymer film is greater than 255° C.; and wherein the metal product resulting from the heating step comprises the polymer film applied to the surface of the metal substrate and the layer of wax adhered to the outer layer of the polymer film.

2. The method of claim 1, wherein applying the layer of wax comprises distributing a volume of waterborne wax using a roll coater or a spray header.

3. The method of claim 1, wherein heating the polymer film and the layer of wax to the temperature above the melting temperature of the polymer film comprises heating the polymer film and the layer of wax above a melting temperature of an outer layer of the polymer film.

4. The method of claim 1, further comprising: measuring a surface roughness parameter of the polymer film after heating the polymer film and the layer of wax; and adjusting a thickness of the layer of wax using the measured surface roughness parameter.

5. The method of claim 1, wherein the metal substrate comprises an aluminum alloy substrate.

6. The method of claim 5, wherein the aluminum alloy substrate comprises a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy.

7. The method of claim 1, wherein the layer of wax comprises polyethylene wax or carnauba wax.

8. The method of claim 1, wherein the polymer film comprises polyethylene terephthalate.

9. The method of claim 1, wherein the polymer film has a roughness average ranging from 1.5 μm to 3.5 μm.

10. The method of claim 1, further comprising applying a layer of lacquer to the metal substrate opposite the surface the polymer film is applied.

11. The method of claim 1, further comprising preheating the polymer film to a first temperature ($T_1$) before heating the polymer film and the layer of wax to the temperature above the melting temperature of the polymer film.

12. The method of claim 11, wherein the first temperature ($T_1$) is below the melting temperature of the polymer film.

13. The method of claim 11, wherein the first temperature ($T_1$) is within a range from 120° C. and 250° C.

* * * * *